United States Patent
Schwarzer

(10) Patent No.: US 6,698,241 B1
(45) Date of Patent: Mar. 2, 2004

(54) METHOD AND DEVICE FOR PRESSING A GOB

(75) Inventor: Siegfried Schwarzer, Stöckse (DE)

(73) Assignee: Hermann Heye, Obernkirchen (DE)

( * ) Notice: Subject to any disclaimer, the term of this patent is extended or adjusted under 35 U.S.C. 154(b) by 286 days.

(21) Appl. No.: 09/786,668

(22) PCT Filed: Jul. 25, 2000

(86) PCT No.: PCT/EP00/07088

§ 371 (c)(1),
(2), (4) Date: Mar. 8, 2001

(87) PCT Pub. No.: WO01/09049

PCT Pub. Date: Feb. 8, 2001

(30) Foreign Application Priority Data

Jul. 30, 1999 (DE) .......................... 199 35 866

(51) Int. Cl.[7] .......................... C03B 11/06; C03B 11/16
(52) U.S. Cl. .............. 65/29.12; 65/76; 65/79; 65/158; 65/160; 65/229; 65/362
(58) Field of Search .............. 65/29.12, 29.18, 65/76, 79, 158, 160, 229, 323, 362

(56) References Cited

U.S. PATENT DOCUMENTS

| 424,524 A | * | 4/1890 | Washington | 65/177 |
| 781,539 A | * | 1/1905 | Marsh | 65/209 |
| 1,670,821 A | * | 5/1928 | Pauwing et al. | 65/229 |
| 4,336,050 A | | 6/1982 | Northup | 65/82 |
| 4,411,681 A | | 10/1983 | Northup | 65/77 |
| 4,662,923 A | * | 5/1987 | Vajda et al. | 65/29.15 |
| 4,662,928 A | | 5/1987 | Dauer | 65/307 |
| 5,236,485 A | * | 8/1993 | Leweringhaus et al. | 65/29.1 |
| 5,318,616 A | * | 6/1994 | Keller | 65/158 |

FOREIGN PATENT DOCUMENTS

| DE | 32 32 288 C1 | 10/1983 | C03B/9/193 |
| EP | 0 327 240 A1 | 8/1989 | C03B/9/40 |
| GB | 2 178 421 A | 2/1987 | C03B/5/26 |

* cited by examiner

*Primary Examiner*—Sean Vincent
(74) *Attorney, Agent, or Firm*—Synnestvedt & Lechner LLP

(57) ABSTRACT

Method and apparatus for pressing a parison. A parison mold is composed of neck tool halves and parison mold halves. A gob of molten glass had first been introduced through an upper loading orifice into a cavity of the parison mold, while a pressing plunger was located in a lower loading position. An assembly consisting of a pressing element, a guide sleeve and a piston-cylinder unit was introduced into the loading orifice. Subsequently the pressing plunger was raised from its loading position into the illustrated upper end operating position until its annular end face had moved into position against a stop surface of the neck tool. Following the preliminary pressing process a neck chamber in the cavity is still free from molten glass. It is only at this point that the pressing element exerts pressure on a base of the parison which is being produced. The molten glass is also pressed into the hitherto still free neck chamber of the cavity. The finish-pressing process of the parison is thus completed and the parison mold can be opened for the purpose of transferring the parison into a finish-forming station.

23 Claims, 8 Drawing Sheets

METHOD AND DEVICE FOR PRESSING A GOB

BACKGROUND OF THE INVENTION

The invention relates to a method and apparatus for producing a parison by means of a pressing process in a parison mold of a press-blow glass forming machine.

In the case of a known apparatus of this type (U.S. Pat. No. 4,336,050 A) the loading orifice is located at the top in a block mold which is not longitudinally divided. A longitudinally-divided parison mold middle piece is disposed between the block mold and the neck mold. The neck mold comprises a longitudinally-divided neck tool and a guide ring, which is not longitudinally-divided and is held in a radial groove of the neck tool, for the pressing plunger. The end operating position of the pressing plunger is defined by virtue of the fact that an upper annular surface of a pressing plunger holder moves into position against an annular counter surface of the guide ring. Owing to the axial play, which increases as the wear increases, between the guide ring and the closed neck tool the end operating position changes in an undesired manner. The axial outer sealing edge of the neck is obviously formed by the opposite radial end face of the guide ring. This leads to undesired sharp-edged glass seams, which are pressed into the mold gaps at the transition from the radially extending, axially outer sealing edge to the adjacent radially inner and radially outer neck contour. These glass seams also impair the sealing effect between the neck and its closure device.

With respect to the prior art, FIGS. 1 and 2 of U.S. Pat. No. 4,662,928 A disclose a forming tool of a blow-blow machine known per se for producing champagne bottles. It comprises a longitudinally-divided parison mold and a longitudinally-divided neck tool. An axially moveable plunger lies in its axial end operating position against the closed neck tool. The plunger forms a small, radially inner part of the axially outer sealing edge of the neck of the champagne bottle. The remaining part of the sealing edge is formed by the neck tool. An annular glass seam is pressed between these two sealing edge parts into the parting line between the plunger and the neck tool (FIGS. 2 and 3A). Moreover, opposite perpendicular glass seams, which originate from the juncture plane of the neck tool, extend as far as into the sealing edge. These glass seams must be subsequently removed in a costly procedure by "fire polishing" (FIG. 3B). In order to avoid these disadvantages U.S. Pat. No. 4,662,928A proposes to allow the entire sealing edge to be formed by a guide ring which is not divided and which is held in the neck tool (FIGS. 4 to 6). However, this then causes similar disadvantages to those experienced in U.S. Pat. No. 4,336,050A.

In the case of apparatus known per se (FIG. 1 or EP 0 327 240 A1) the end operating position of the pressing plunger is determined exclusively by the deforming resistance of the molten glass when the cavity is completely filled with glass and the parison has been completely pressed. Thus, the end operating position of the pressing plunger depends upon the respective mass of the gob and/or of the respective volume of the cavity. The pressing plunger comprises on its foot a slightly conical, almost cylindrical guide section. The slight conical shape is intended to facilitate the subsequent removal of the pressing plunger from the parison. On a final part of the path of the pressing plunger as far as into its end operating position the guide section is received into a guide ring, which is not longitudinally divided, and as a result is centered in the radial direction and guided. Owing to the slight conical shape of the guide section a radial gap, whose width depends upon the respective end operating position of the pressing plunger, remains between the guide section and the guide ring. During the pressing process it is possible in certain operating situations for the glass mass to penetrate into this gap in an undesired manner. The guide ring is held radially outside in a holding groove of the neck tool. The guide ring comprises on its end facing the cavity a forming ring for forming the axially outer sealing edge of the neck of the parison.

It is known per se from U.S. Pat. No. 4,411,681 A to raise a plunger first into its end operating position in which a ring of the plunger lies against an undivided guide ring of a neck mold (FIGS. 1 to 3). A glass gob then falls into a filling orifice of a mold cavity of a longitudinally- and transversely-divided parison mold and onto the tip of the plunger. A blow head is introduced from the top into the filling orifice (FIG. 2) and blows the glass gob firmly into the parison mold and the neck mold and around the plunger, wherein a space is existing between the blow head and the glass (FIG. 3). The plunger is subsequently lowered into a middle position (FIG. 4). Compressed air is introduced through the neck and preliminarily blows the parison until it also contacts the blow head. Finally, the finished parison is removed from the parison mold (FIG. 5). This combined process of settle and preliminarily blowing the parison whilst using the plunger requires an expensive construction and a comparatively long cycle. Moreover, it is disadvantageous that a sealing edge of the neck of the parison is formed by means of the guide ring.

It is known per se from U.S. Pat. No. 4,411,681 A to raise a plunger first into its end operating position in which a ring of the plunger lies against an undivided guide ring of a neck mold (FIGS. 1 to 3). A glass gob then falls into a filling orifice of a mold cavity of a longitudinally- and transversely-divided parison mold and onto the tip of the plunger. A blow head is introduced from the top into the filling orifice (FIG. 2) and blows the glass gob firmly into the parison mold and the neck mold and around the plunger, wherein a space is existing between the blow head and the glass (FIG. 3). The plunger is subsequently lowered into a middle position (FIG. 4). Compressed air is introduced through the neck and preliminarily blows the parison until it also contacts the blow head. Finally, the finished parison is removed from the parison mold (FIG. 5). This combined process of settle and preliminarily blowing the parison whilst using the plunger requires an expensive construction and a comparatively long cycle. Moreover, it is disadvantageous that a sealing edge of the neck of the parison is formed by means of the guide ring.

It is known per se from DE 32 32 288 C1 to introduce the glass gob into a block mold cavity. The volume of the block mold cavity is first enlarged by an additional volume. This can occur by moving a piston downwards in a base cavity of the block mold. The additional volume is nullified again by virtue of the upwards movement of the piston until the parison has been formed.

Apparatus for adjusting the mass of the glass gob on a feeder device is known per se from GB 2 178 421 A.

SUMMARY OF THE INVENTION

The object of the invention is to improve the manner in which the neck of the parison is formed.

This object is achieved with respect to the method by virtue of a method for producing a parison in a parison mold, wherein the parison has a neck, a base and an axially outer sealing edge of the neck. The parison mold has a cavity and a neck mold, the neck mold having a through passage and a neck tool which forms the neck of the parison, and wherein the neck tool has a stop surface. The method includes the following steps: (a) introducing a gob of molten glass into the cavity of the parison mold; (b) pressing a pressing plunger into the gob through the through passage until the pressing plunger reaches an end operating position defined by the stop surface to preliminarily press the parison; and (c) simultaneously with or following step (b), exerting pressure on the base of the parison with a pressing element, which defines part of the cavity, until the cavity is completely filled with the molten glass and the parison is finished-pressed, wherein the axially outer sealing edge of the neck is completely formed by the pressing plunger.

Owing to the fact that the pressing plunger moves into position against the neck tool, the pressing plunger, in an extremely precise manner, always reaches the same end operating position irrespective of the mass of the glass gob and the volume of the cavity in the parison mold. This creates uniform inner contours of the necks of the parisons. Furthermore, because the entire axially outer sealing edge of the neck is no longer formed by the guide ring but rather by the pressing plunger itself, the slightly conical guide section can be formed in a more conical shape at the foot of the pressing plunger in a favorable manner. As a consequence, the pressing plunger can be removed easier from the finish-pressed parison and damage to the neck inner surface of the parison is prevented. The parison is pressed in two stages. In the first stage the parison is pre-pressed by the pressing plunger until the pressing plunger reaches its end operating position and in the second stage the parison is finish-pressed by the pressing element. The result is a parison with an ideally pressed-out, undamaged neck and also the glass is distributed in an extremely favorable manner. The invention is particularly suitable for use in the so-called I.S. (Individual Section) press-blow glass forming machines.

Additional features of the invention include contacting the gob with the pressing element within the cavity opposite to the pressing plunger upon the step of pressing the pressing plunger through the through passage and into the gob of molten glass; and moving the pressing element in a direction out of the cavity, where the moving is done by the gob acting on said pressing element. These features hold the pressing element in contact with the glass for a comparatively long period of time.

Additional features are provided where the parison mold includes longitudinally-divided parison mold halves having a loading orifice formed in a base of the parison mold halves, and wherein the above method further includes the steps of: introducing the gob of molten glass into the cavity through the loading orifice; and closing the loading orifice with the pressing element. Here, the loading orifice can be designed in a funnel-like manner in order to improve and facilitate the manner in which the glass gob can be introduced without interference into the cavity. In most cases this negates the requirement for a separate loading funnel. Such a loading funnel would otherwise need to be moved as a separate element over the loading orifice for loading purposes and be removed once the loading is complete. This would mean higher structural and operational costs.

It is not possible in practice to avoid fluctuations in the mass of the glass gob. The features of another embodiment of the invention render it possible in a rapid and reliable manner to influence the manner in which the desired optimum gob mass is maintained. Such features include determining a maximum penetration depth of the pressing element into the cavity by sensing the movement of the pressing element relative to the parison mold; and controlling the mass of the gob of molten glass introduced into the cavity by sensing the movement of the pressing element relative to the parison mold.

The object mentioned above is achieved with respect to the apparatus by virtue of an apparatus for producing a parison from a gob of molten glass wherein the parison has a neck, a base, and an axially outer sealing edge. The apparatus includes:

- a parison mold having a cavity, a loading orifice through which the molten gob is received into the cavity, and a neck mold having a longitudinally divided neck tool for forming the neck of the parison, the neck mold having a through passage;
- a pressing plunger movable through the through passage for pressing into the glass gob in the cavity, the pressing plunger being movable to an end operating position against the neck mold wherein the pressing plunger lies against the neck tool, the pressing plunger being configured to completely form the axially outer sealing edge, the pressing plunger being removable from the parison after the parison has been formed; and
- a pressing element movable relative to the parison mold and which defines a part of the cavity, the pressing element capable of exerting pressure on the base of the parison in the cavity until the cavity is filled with the molten glass and the parison is finished-pressed, including the formation of the axially outer sealing edge. Essentially the same advantages as mentioned above in connection with the method are achieved.

The parison mold of the apparatus can further include longitudinally-divided parison mold halves, the loading orifice being formed in a base of the parison mold halves, and the pressing element is movable into the cavity through the loading orifice and is capable of closing the loading orifice. The loading orifice can in preference be formed in the shape of a funnel in order to facilitate and improve the manner in which the glass gob is introduced into the cavity.

In another embodiment, the parison mold comprises a non longitudinally-divided block mold which has a locking ring that lies adjacent to the neck tool. The pressing element is displaceably mounted in a lower base orifice of the block mold, and the neck tool in the upwards direction is adjacent to the loading orifice of the block mold. These features are of particular advantage when producing wide-neck ware. The closed parison mold can be held together in a particularly convenient manner. It is necessary to hold the parison mold together in order to prevent it opening during the pressing procedure when the pressing forces attempt to open the individual parts of the parison mold. If the parison mold were to open, gaps would occur in the mold into which the glass mass could be pressed in an undesired manner. A longitudinally-divided parison mold middle piece can also be disposed between the block mold and the neck tool according to DE 32 32 288 C1. In this manner it is also possible using a block mold to produce narrow-neck ware.

In another embodiment, the apparatus can further include a shaft adjacent to a foot of the pressing plunger. The shaft has an annular end face and is wider than the pressing plunger. The apparatus also includes a forming ring for forming the complete axially outer sealing edge of the neck, the forming ring being formed in the annular end face. According to these features, the axially outer sealing edge of the neck is no longer formed by a guide ring in the neck tool or by the neck tool, but rather is formed completely by an element of the pressing plunger. This increases the precision in the manner in which the neck is formed. Furthermore, the neck tool can include a stop surface engageable with the end face of the shaft to define the end operating position of the pressing plunger. Here, the end operating position can be achieved structurally in a particularly convenient manner.

By virtue of the features of another embodiment, the pressing plunger can be guided in a precise radial manner in the final path section, which is of particular importance for forming the parison, in the radial direction on a cylindrical shaft surface. In this embodiment, the apparatus includes a cylindrical shaft adjacent to a foot of the pressing plunger, and a centering ring fixed relative to the parison mold. The cylindrical shaft is received on a last part of the path of the pressing plunger as far as its end operating position in the centering ring so as to be guided and centered in the radial direction through the centering ring. Where the centering ring is undivided longitudinally and held radially outwards in a holding groove of the neck tool, the centering ring is also held in a reliable manner in the neck tool when the neck tool is open. The neck tool is only opened during operation for the purpose of discharging the hollow glass object which is finish-formed in the finish-forming station.

BRIEF DESCRIPTION OF THE DRAWINGS

These and further features and advantages of the invention are explained in detail hereinunder with respect to the exemplified embodiments illustrated in FIGS. 2 to 9 of the drawings, in which.

DETAILED DESCRIPTION

Figure 1:
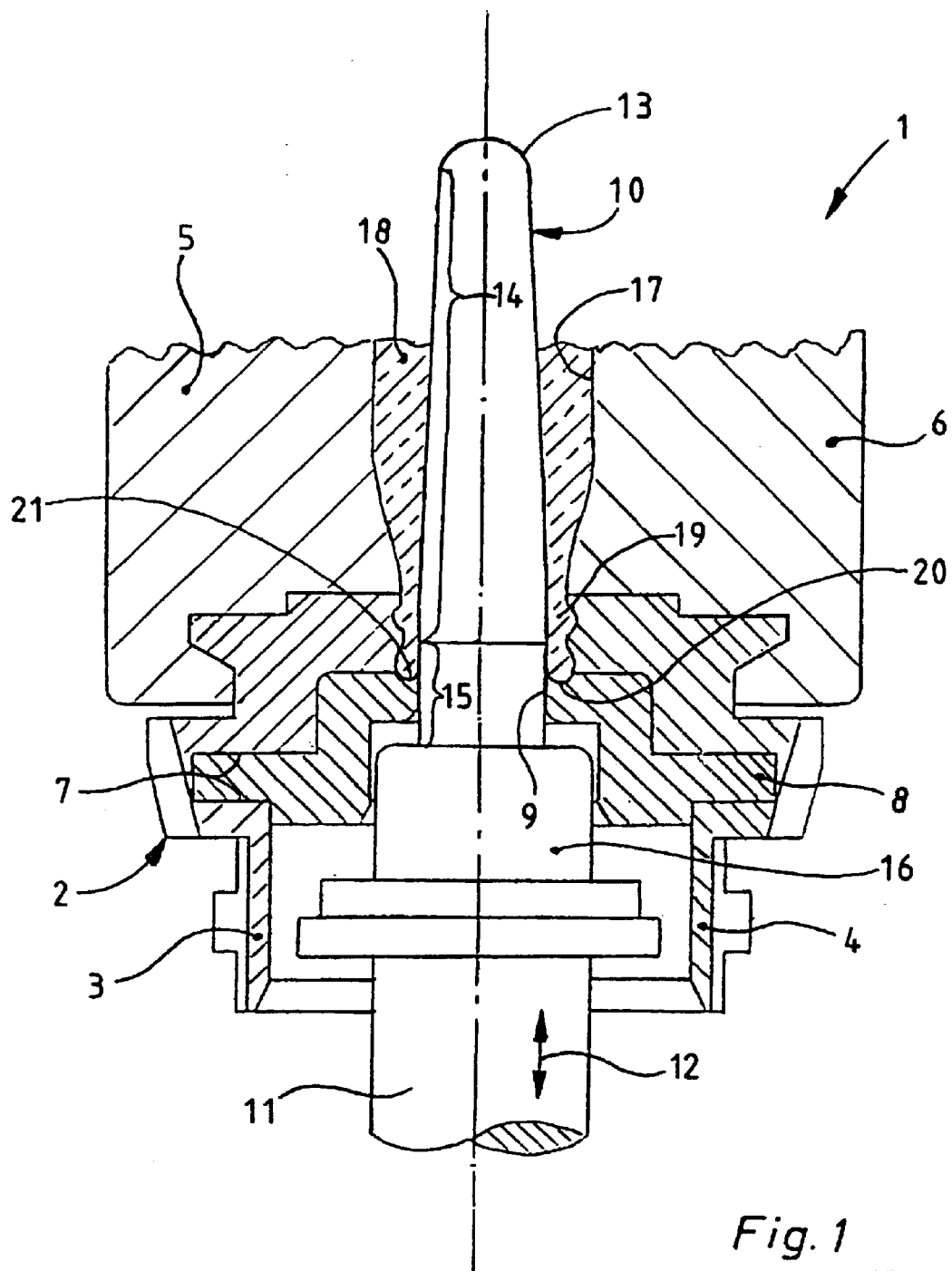
FIG. 1 shows a longitudinal sectional view through a part of a closed parison mold according to the prior art with the pressing plunger in its end operating position.

Referring to FIG. 1, the lower part of a closed parison mold 1 is illustrated. The parison mold 1 includes a neck mold 78, (having a longitudinally-divided neck tool 2 which has neck tool halves 3 and 4), and parison mold halves 5 and 6. A centering ring 8, which is not longitudinally divided, is held in a radial holding groove 7 of the neck tool 2. The centering ring 8 comprises a middle through-passage 9 for a pressing plunger 10. The pressing plunger is mounted on a piston rod 11 of a known piston-cylinder unit, not further illustrated, and can be raised and lowered in the directions of a double arrow 12. The pressing plunger 10 comprises a plunger tip 13, a distinctly conical section 14 and a slightly conical section 15 which forms a foot of the pressing plunger 10. A cylindrical shaft 16 of the pressing plunger 10 which has a larger diameter lies adjacent to the foot 15 in the downwards direction.

In a known manner the parison mold halves 5, 6 are provided at the top with a loading orifice which as shown in FIG. 1 of EP 0 327 240 A1 can be closed by means of a parison mold base once the glass gob has been introduced into the cavity 17 of the parison mold 1 for the pressing procedure.

FIG. 1 illustrates the pressing plunger 10 in its uppermost end operating position which is defined without any additional mechanical stop merely by virtue of the deforming resistance of the molten glass in the cavity 17. Depending upon the mass of the gob of molten glass introduced into the cavity 17 and upon the state of wear of the parison mold 1 and of the pressing plunger 10, the penetration depth of the pressing plunger 10 in the cavity 17 is greater or less when the pressing plunger 10 is in the end operating position. This results in the fact that in normal operation changing axial regions of the slightly conical section 15 of the pressing plunger 10 lie opposite the middle through-passage 9 of the guide ring 8 when the pressing plunger 10 is in the end operating position. This creates annular gaps of different widths between the middle through-passage 9 and the slightly conical section 15 and leads to the greater or less risk of the molten glass being pressed into this annular gap during the pressing procedure.

FIG. 1 illustrates a finish-pressed parison 18 in the cavity 17. The parison comprises at the bottom a neck 19 whose axially outer edge 20 is formed by means of a forming ring 21 formed at the top in the guide ring 8. Since the guide ring 8 is not longitudinally divided, the axial outer edge 20 of the neck 19 does not have any longitudinal seams. This is advantageous in order to be able to close the finished hollow glass object in a reliable manner.

In all the illustrations like parts bear like reference numerals.

Figure 2:
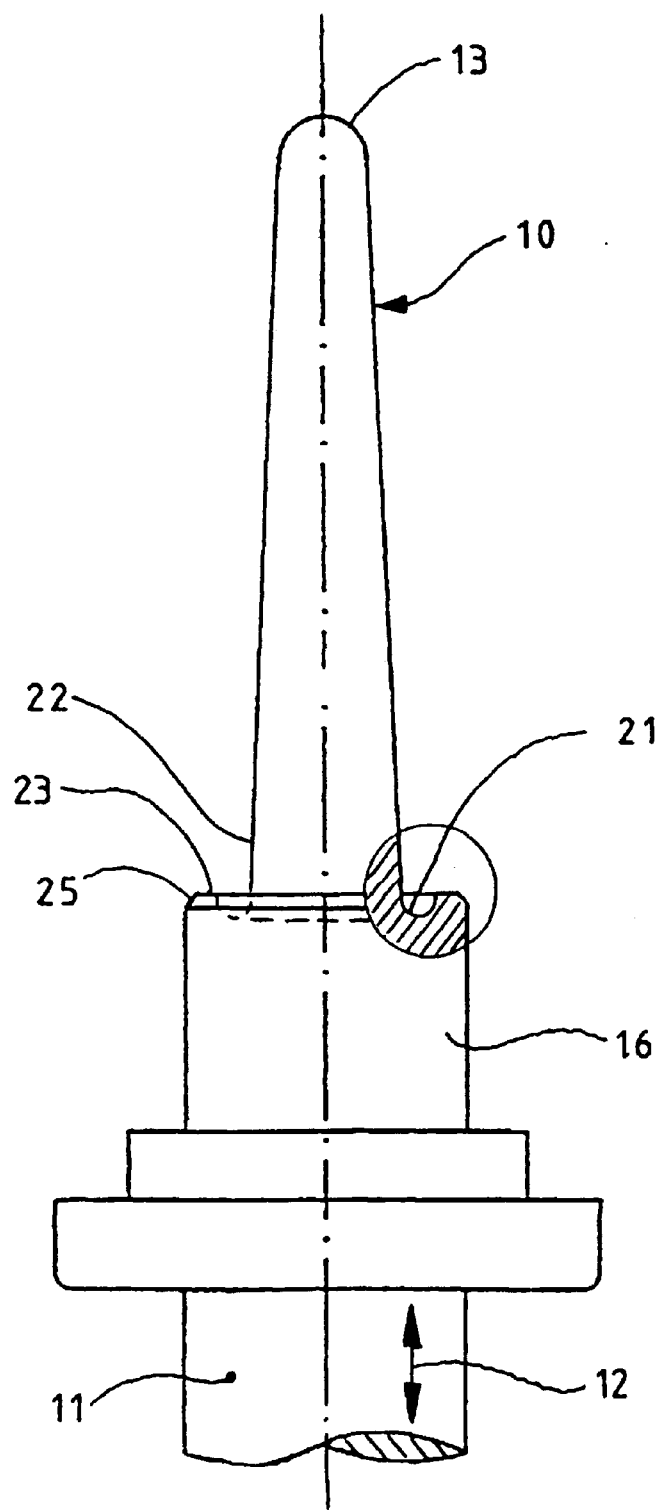
FIG. 2 shows a partially sectioned side view of a pressing plunger according to the invention.

The pressing plunger 10 in accordance with the invention as shown in FIG. 2 is not divided in its length into the sections 14, 15 as shown in FIG. 1, but rather is continuously uniformly conical in shape over its entire length. However, for reasons relating to process technology it is also possible in the case of the pressing plunger 10 in accordance with the invention to provide a conical shape which changes over its length. In any case, it is possible in accordance with the invention to select the conical shape such that once the parison 18 has been finished the pressing plunger 10 can be removed from the parison without damaging the inner surface of the parison.

Figure 4:
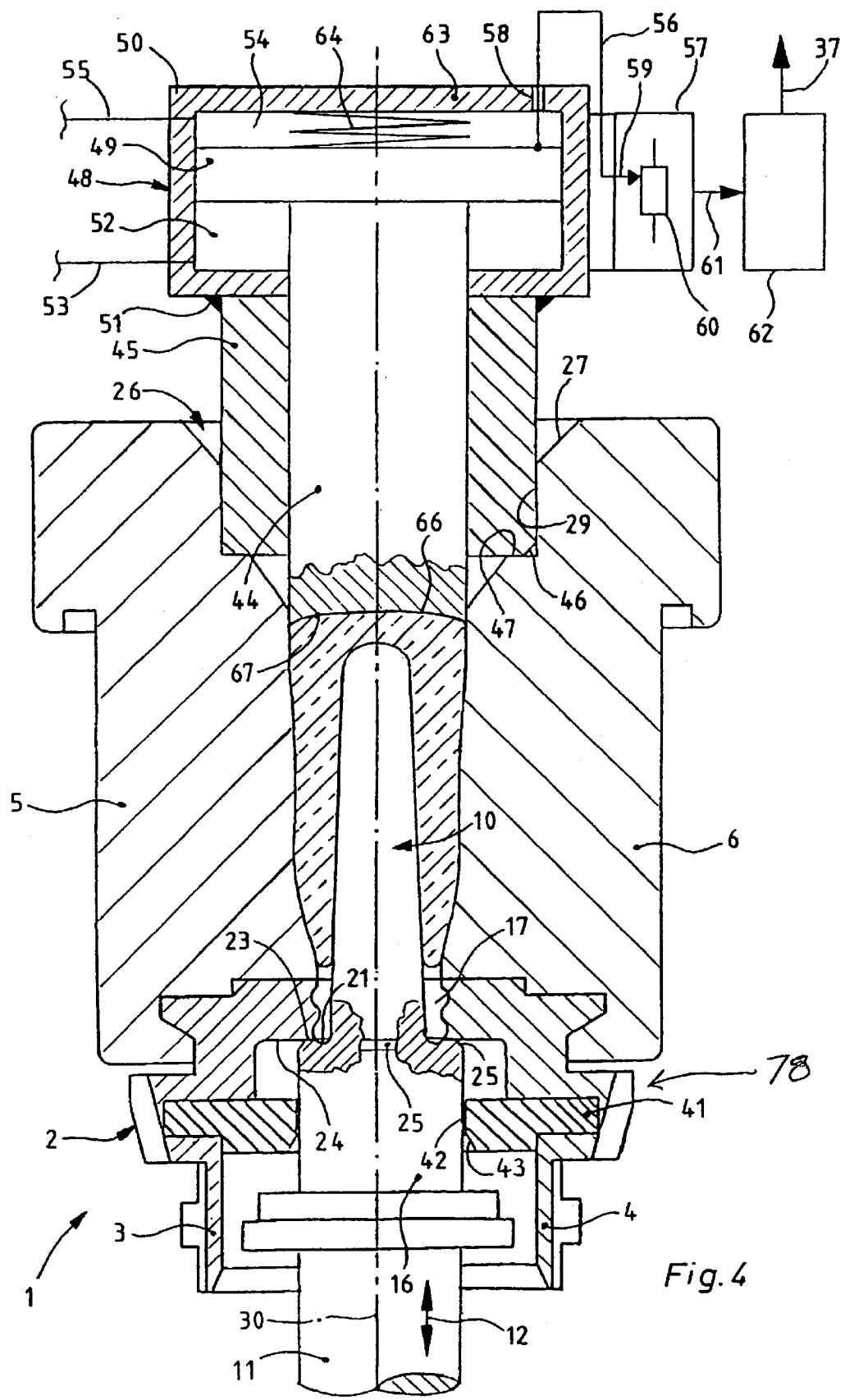
FIG. 4 shows a longitudinal sectional view through the parison mold as shown in FIG. 3 with the pressing element inserted in the loading orifice and the pressing plunger in its end operating position.
Figure 5:
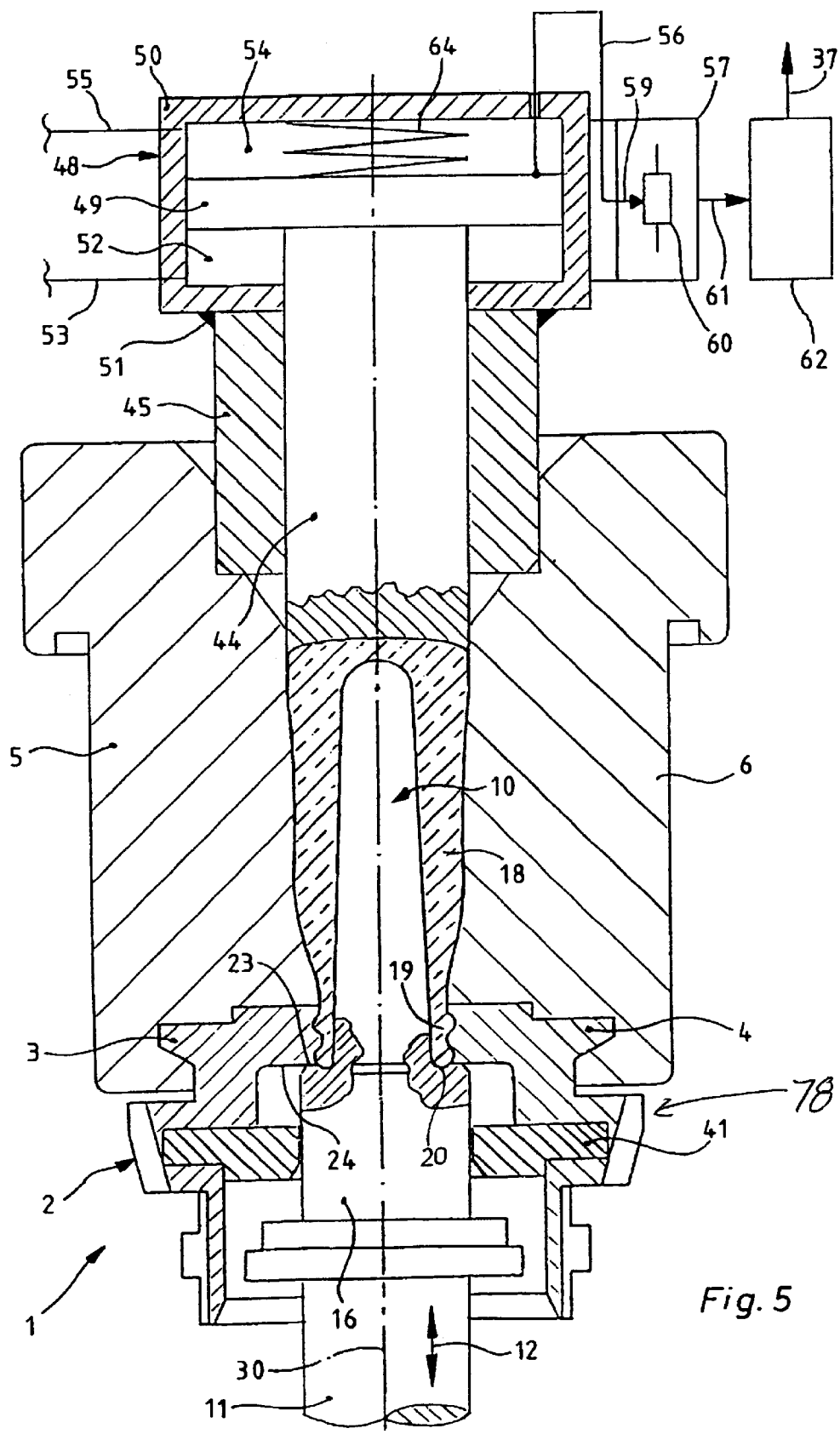
FIG. 5 shows a longitudinal sectional view through the parison mold as shown in FIG. 4 with the pressing element in its end operating position.
Figure 9:
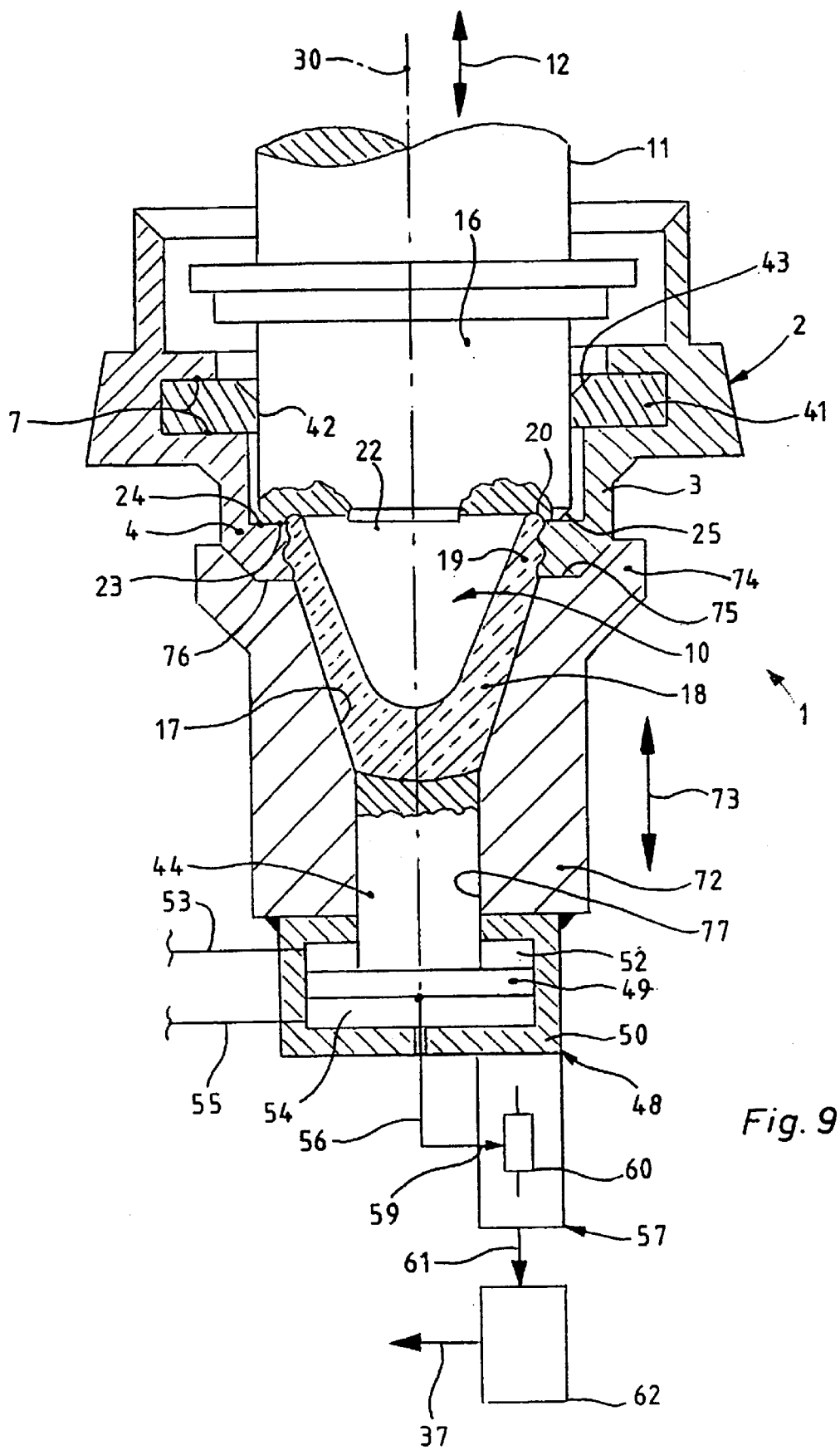
FIG. 9 shows a longitudinal sectional view through a closed parison mold with the block mold and the pressing plunger and the pressing element each in their end operating position.
Figure 1:
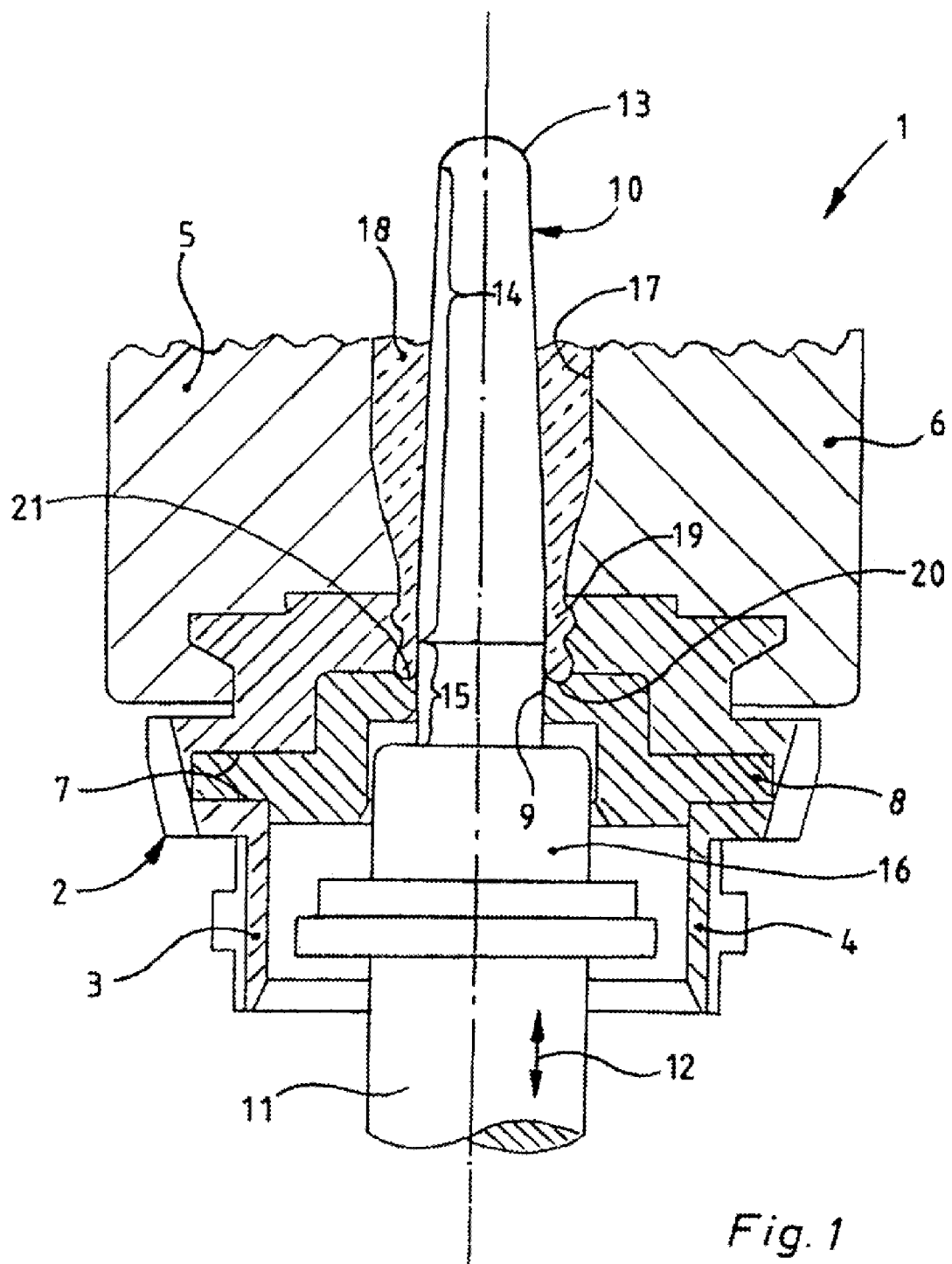
Figure 2:
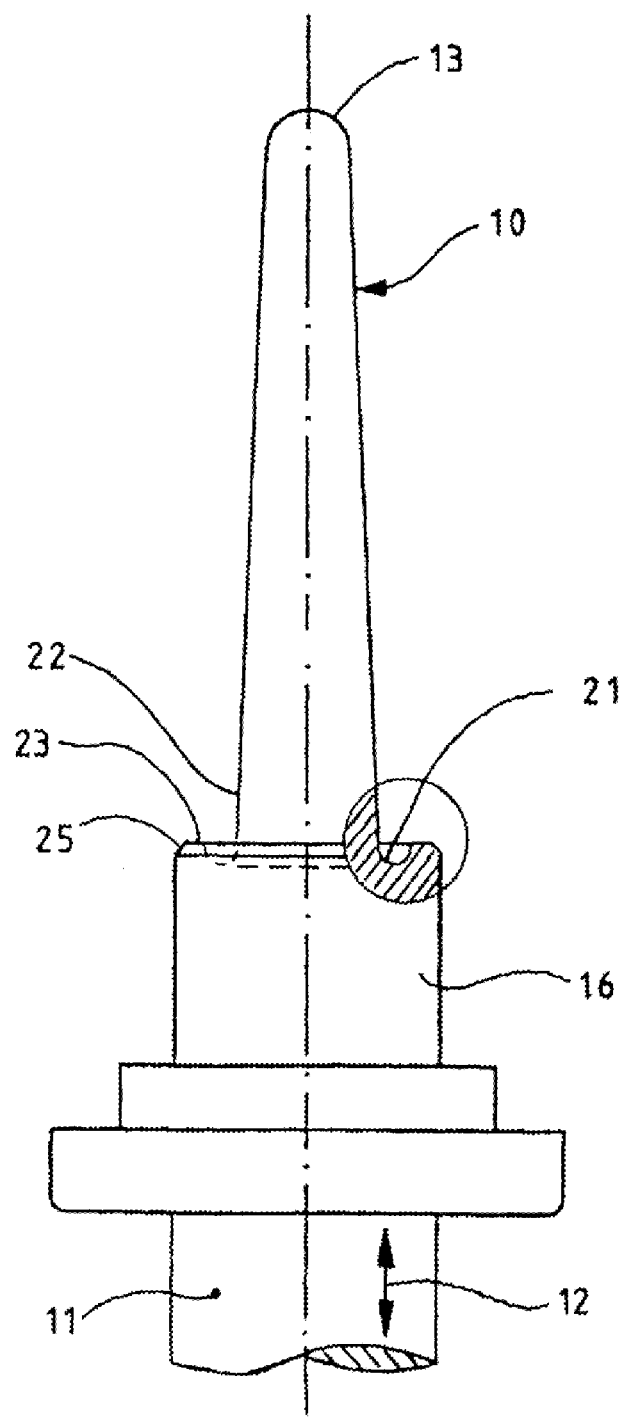
Figure 3:
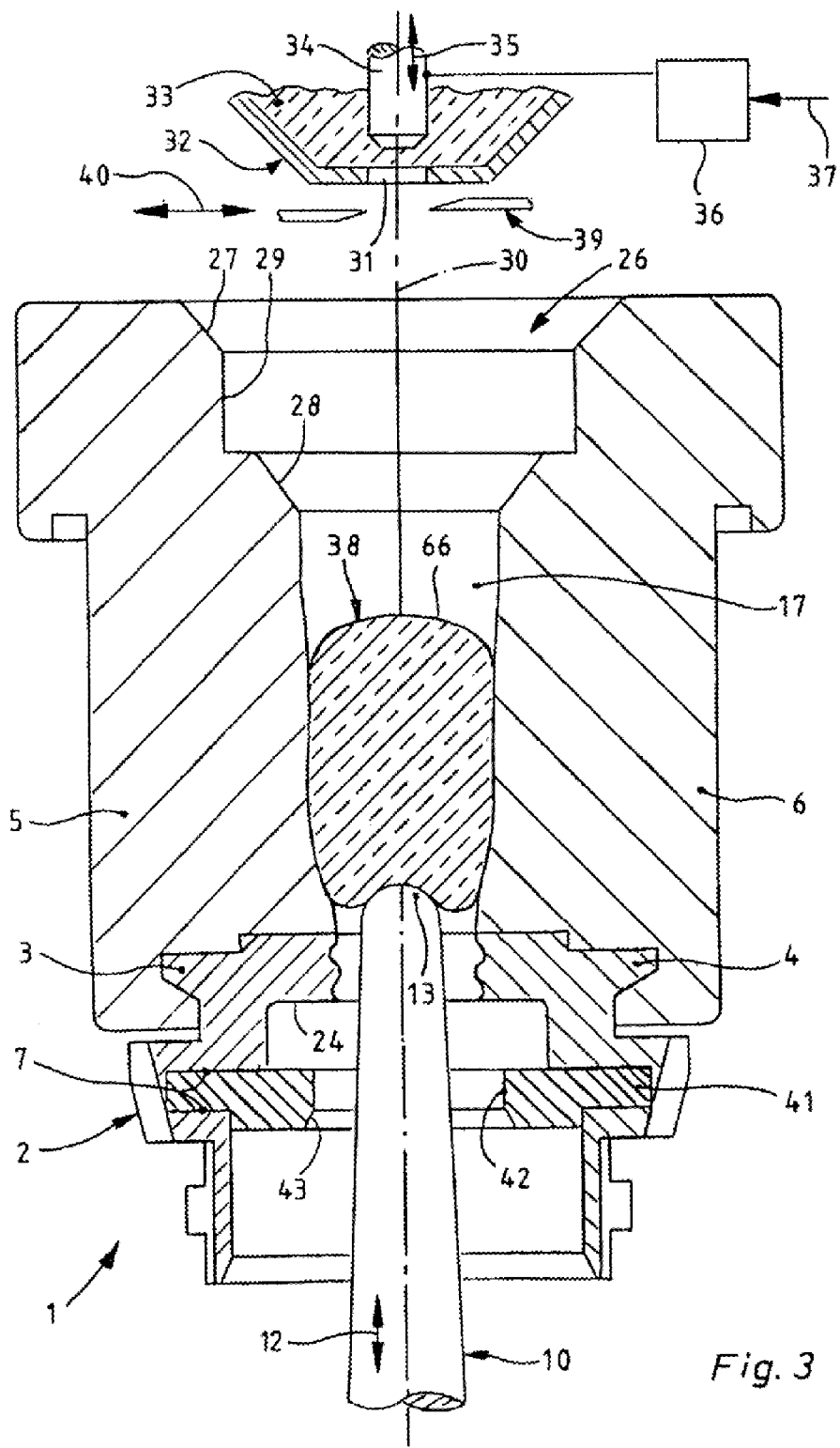
Figure 4:
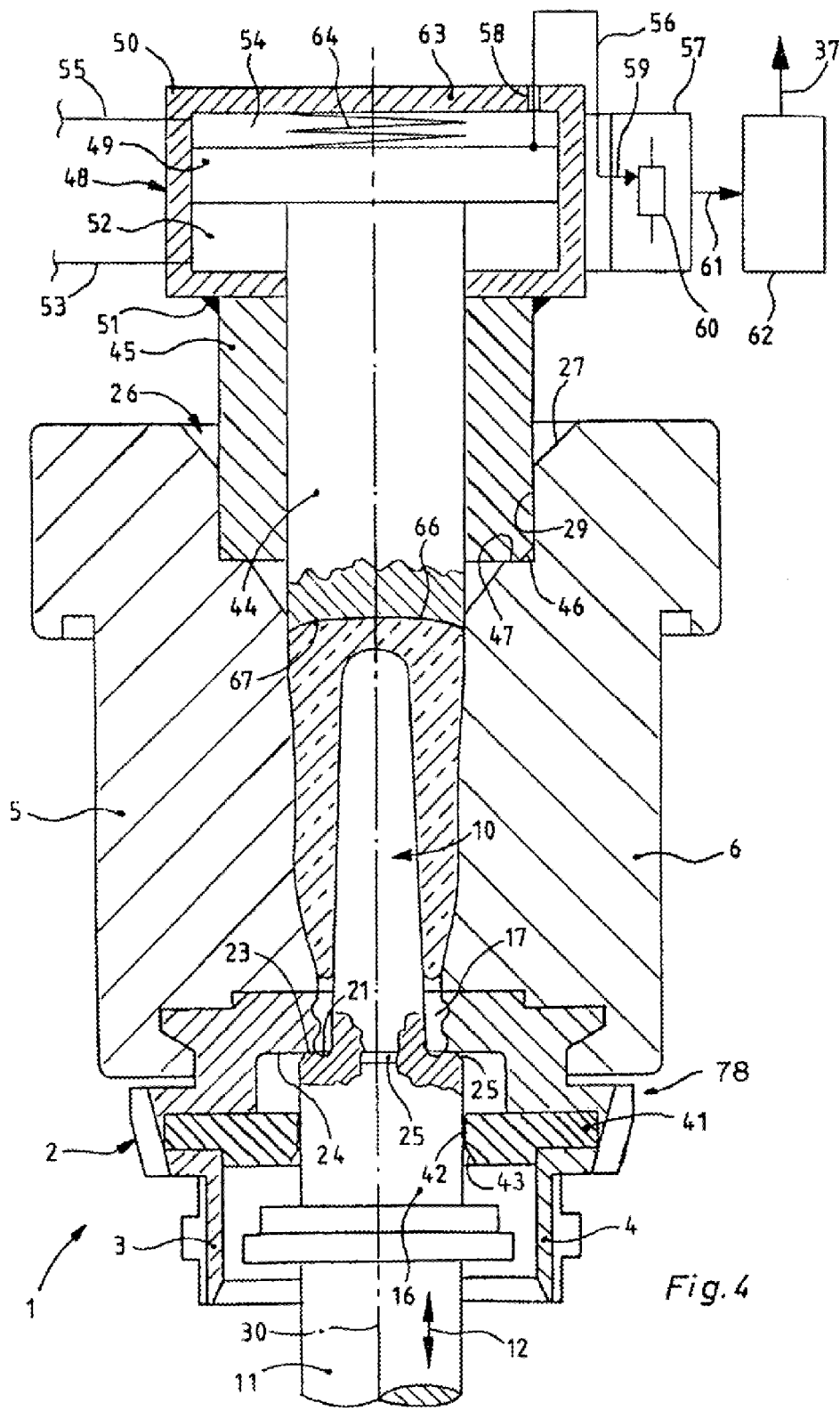
Figure 5:
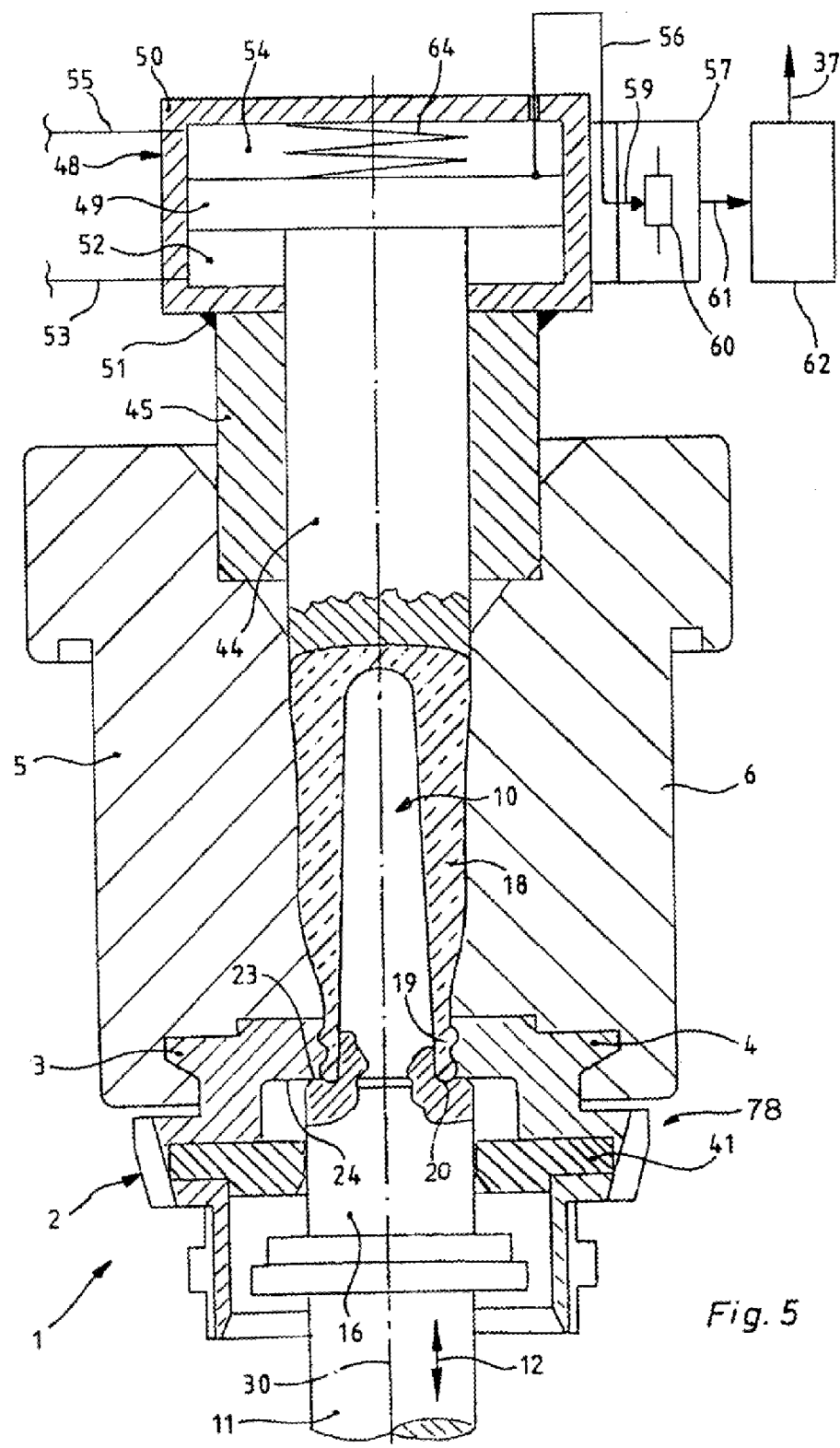
Figure 6:
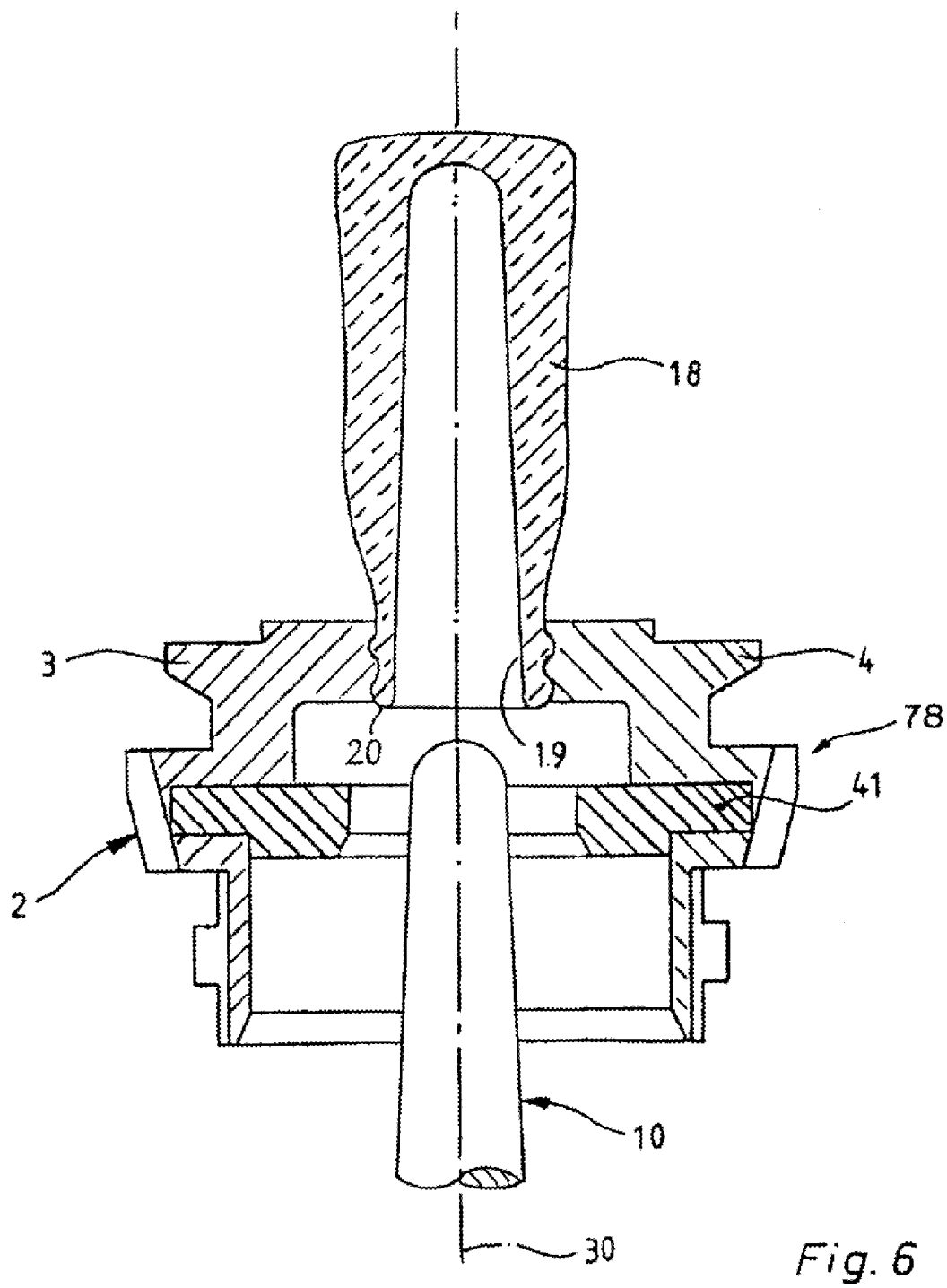
Figure 7:
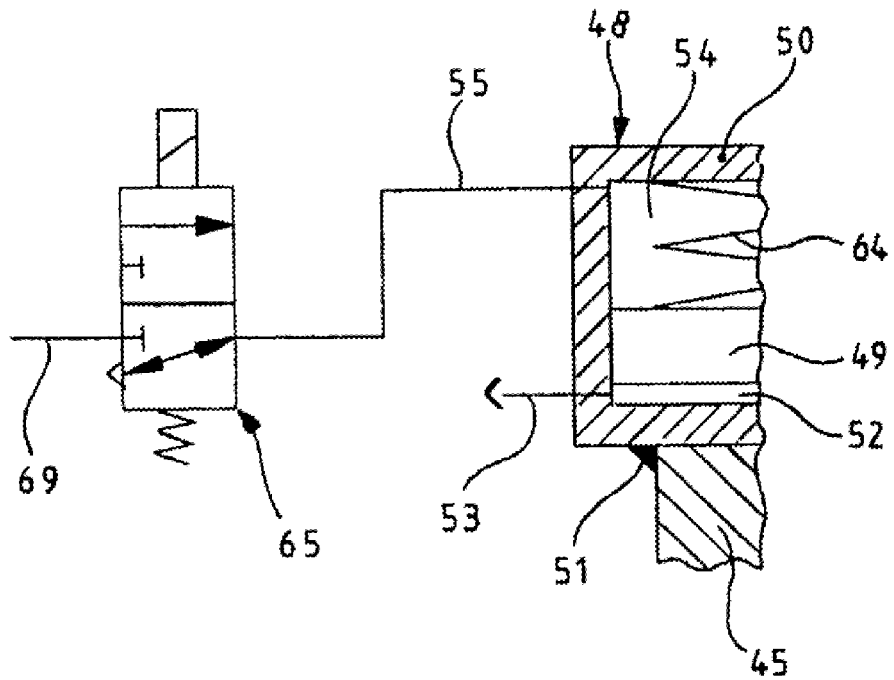
Figure 8:
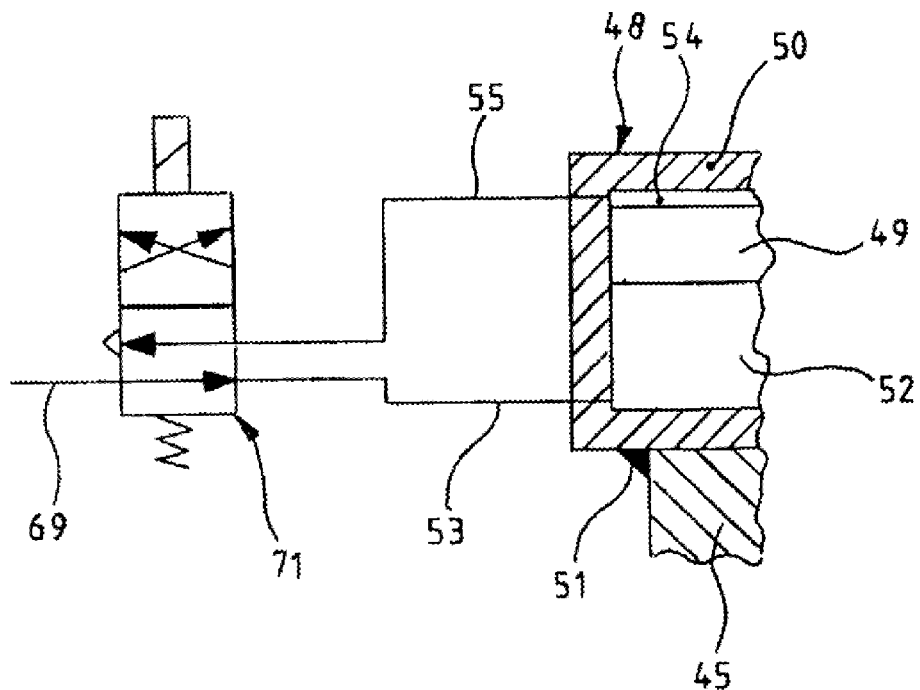
Figure 9:
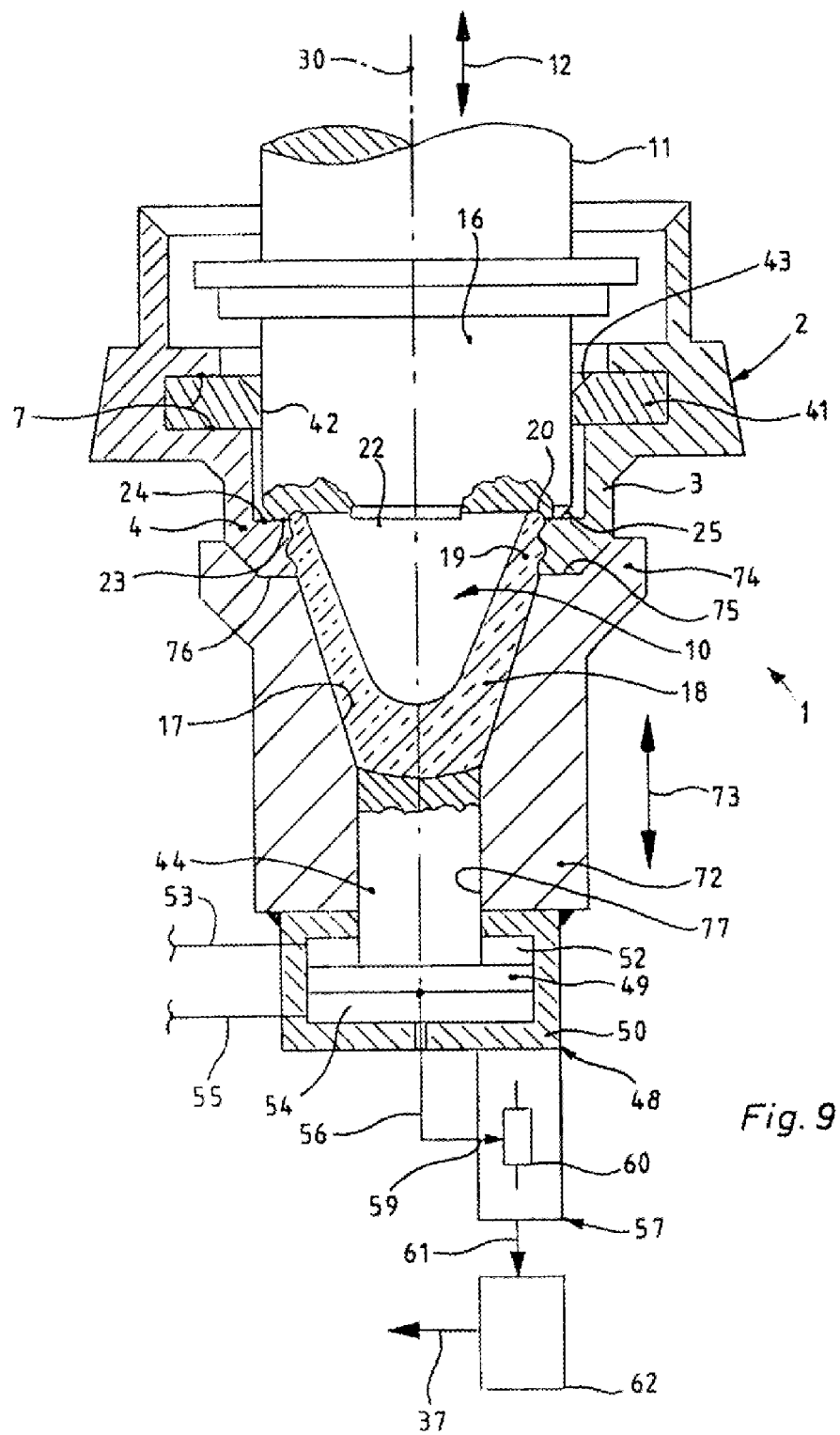
Figure 1:
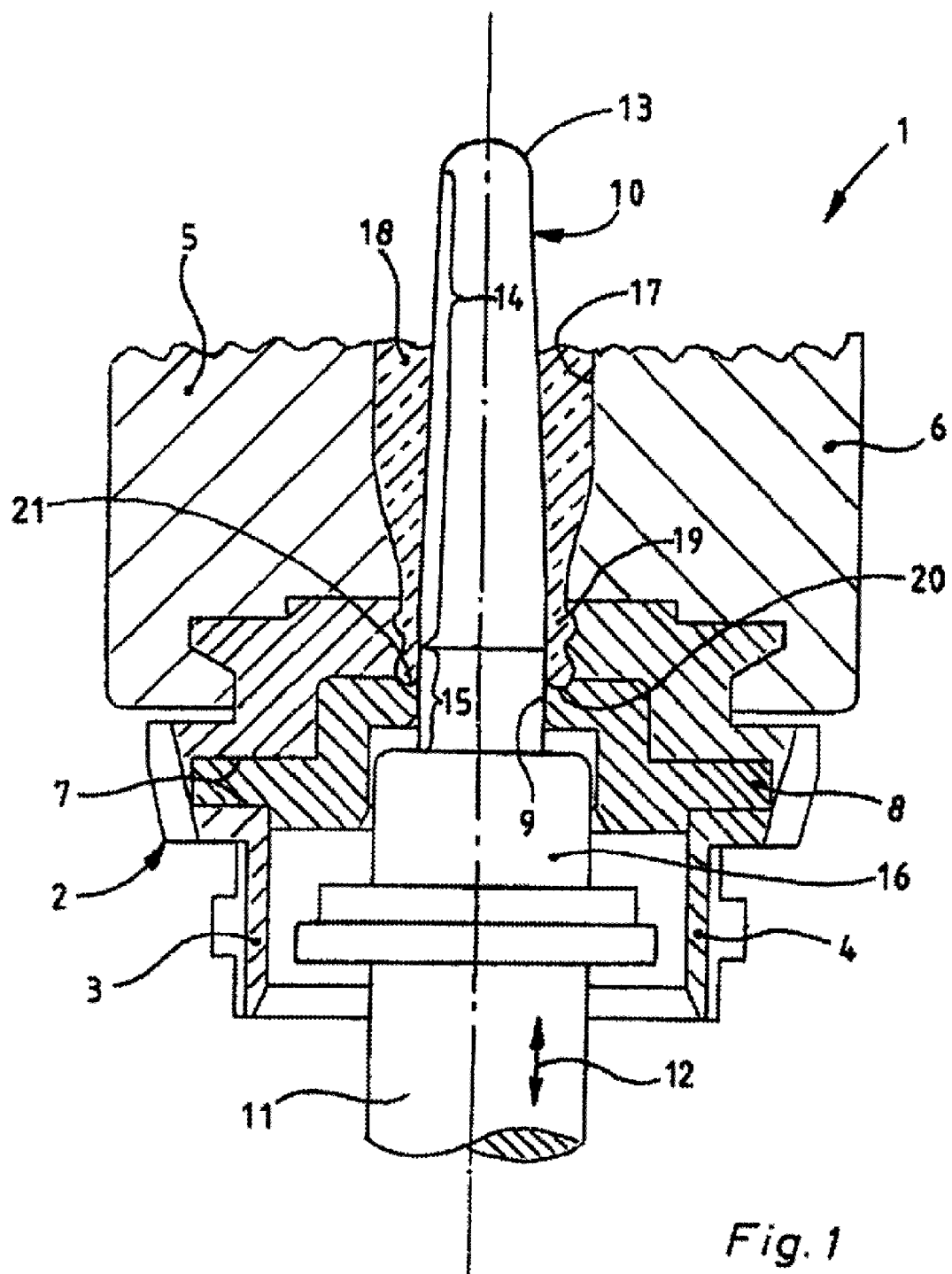
Figure 2:
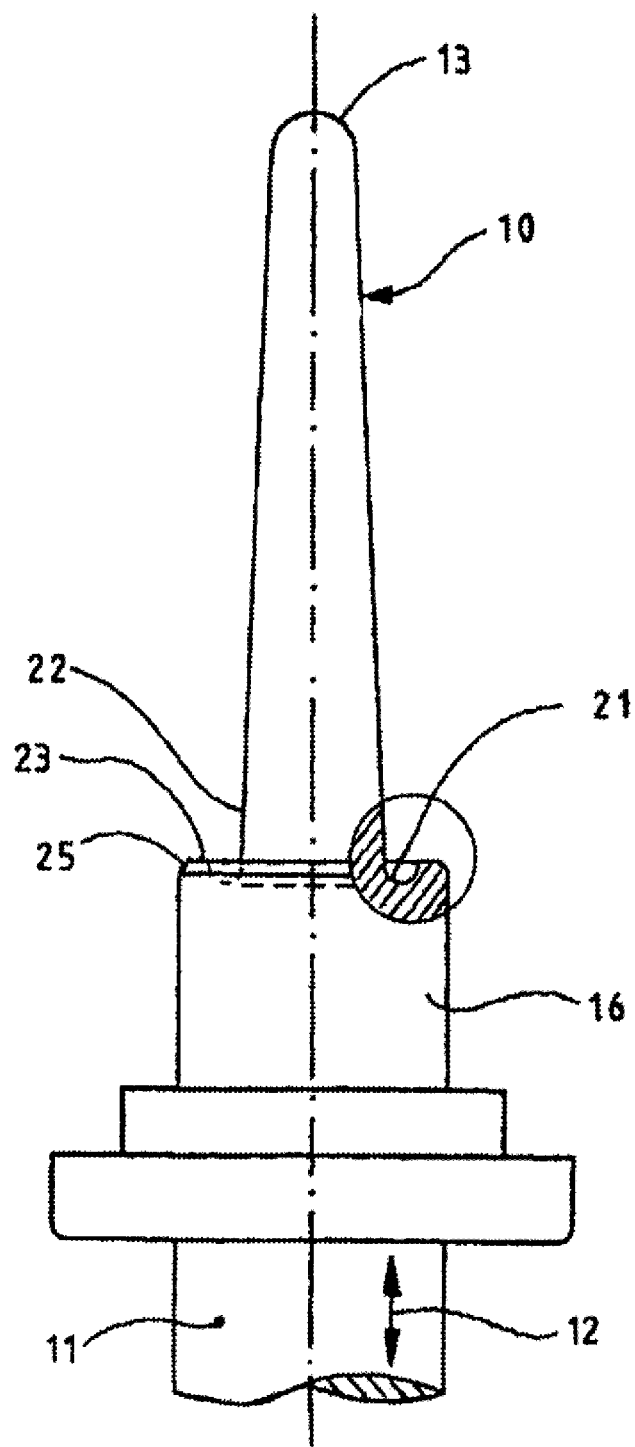
Figure 3:
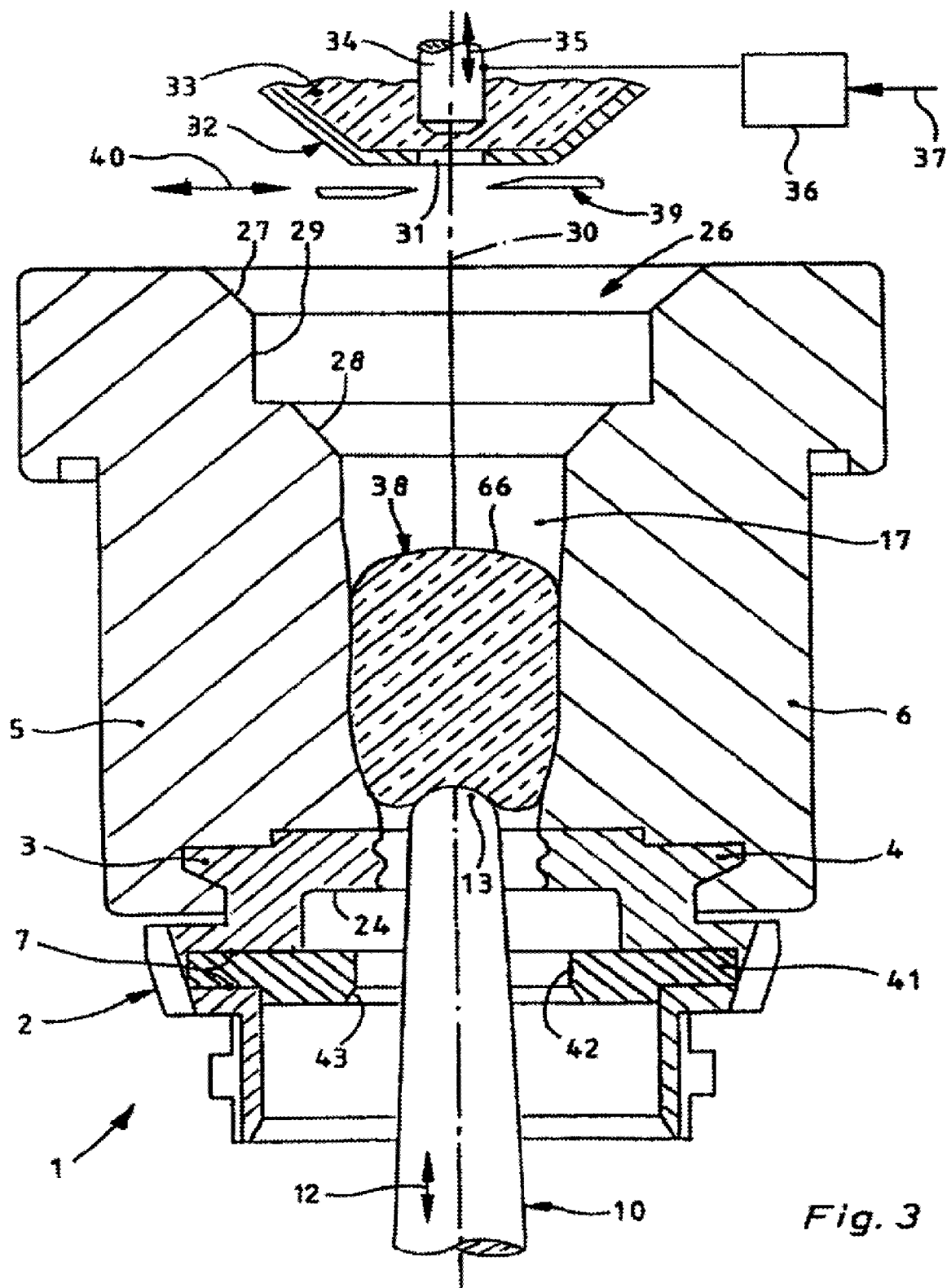
Figure 4:
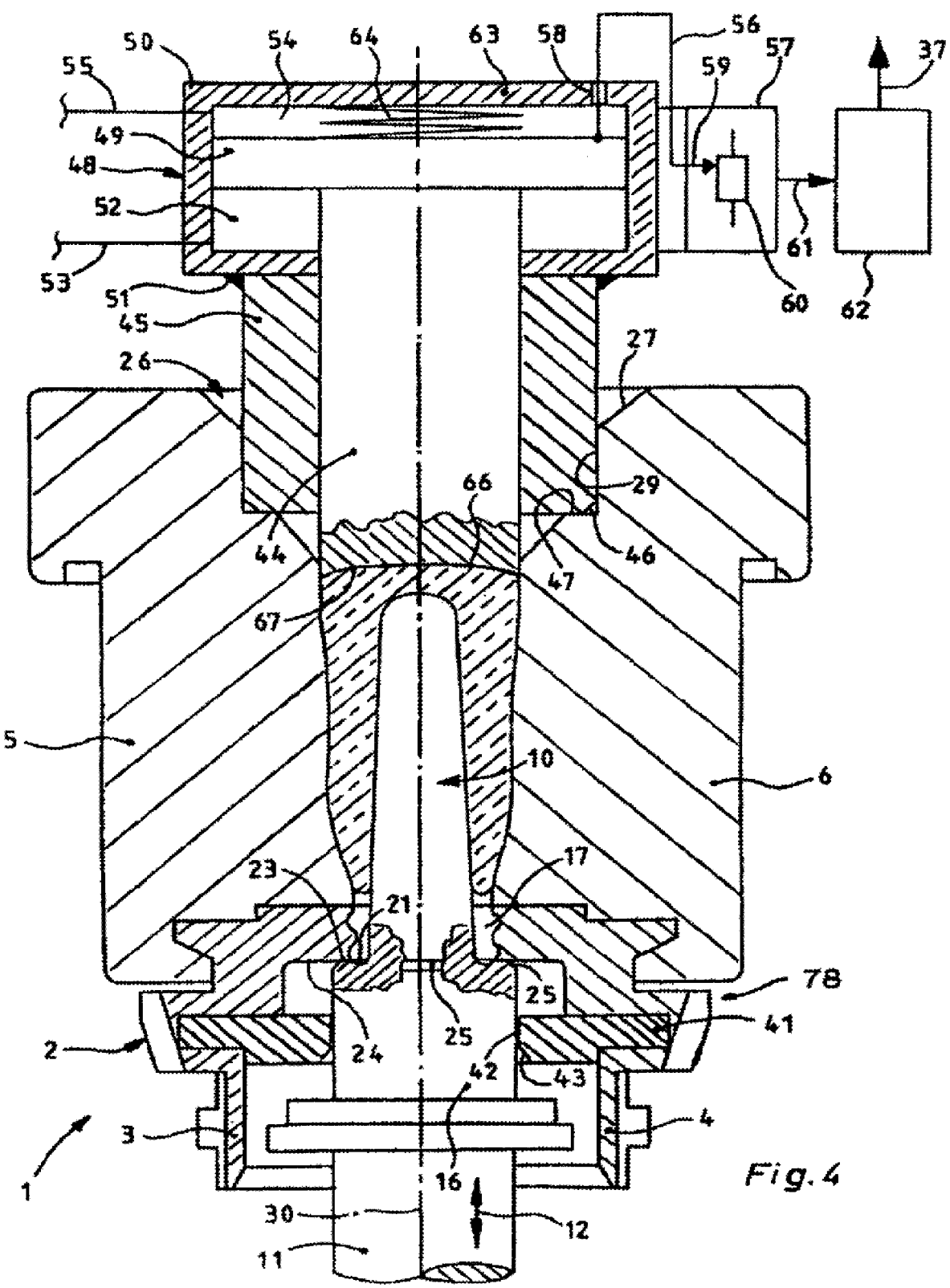
Figure 5:
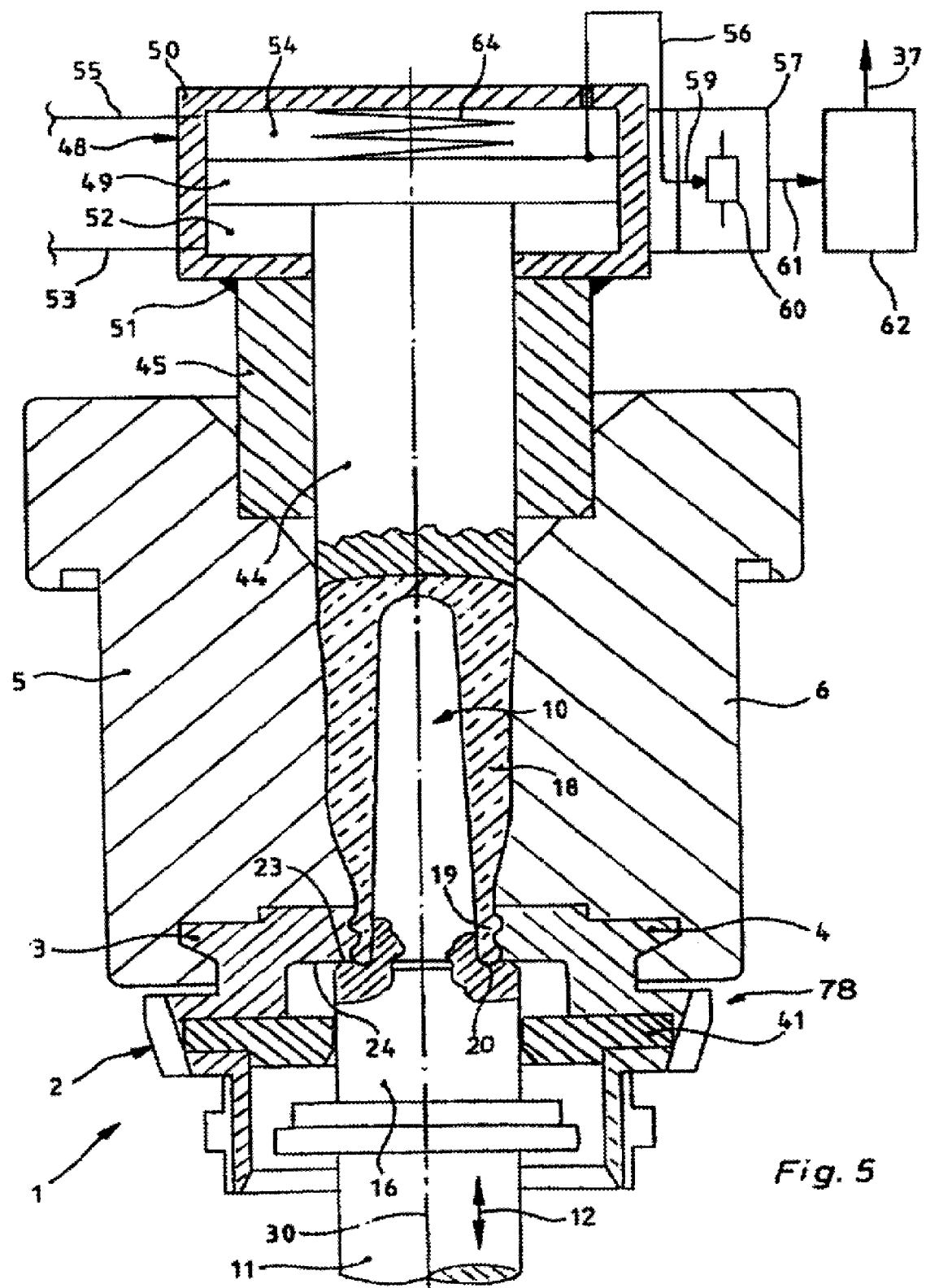
Figure 6:
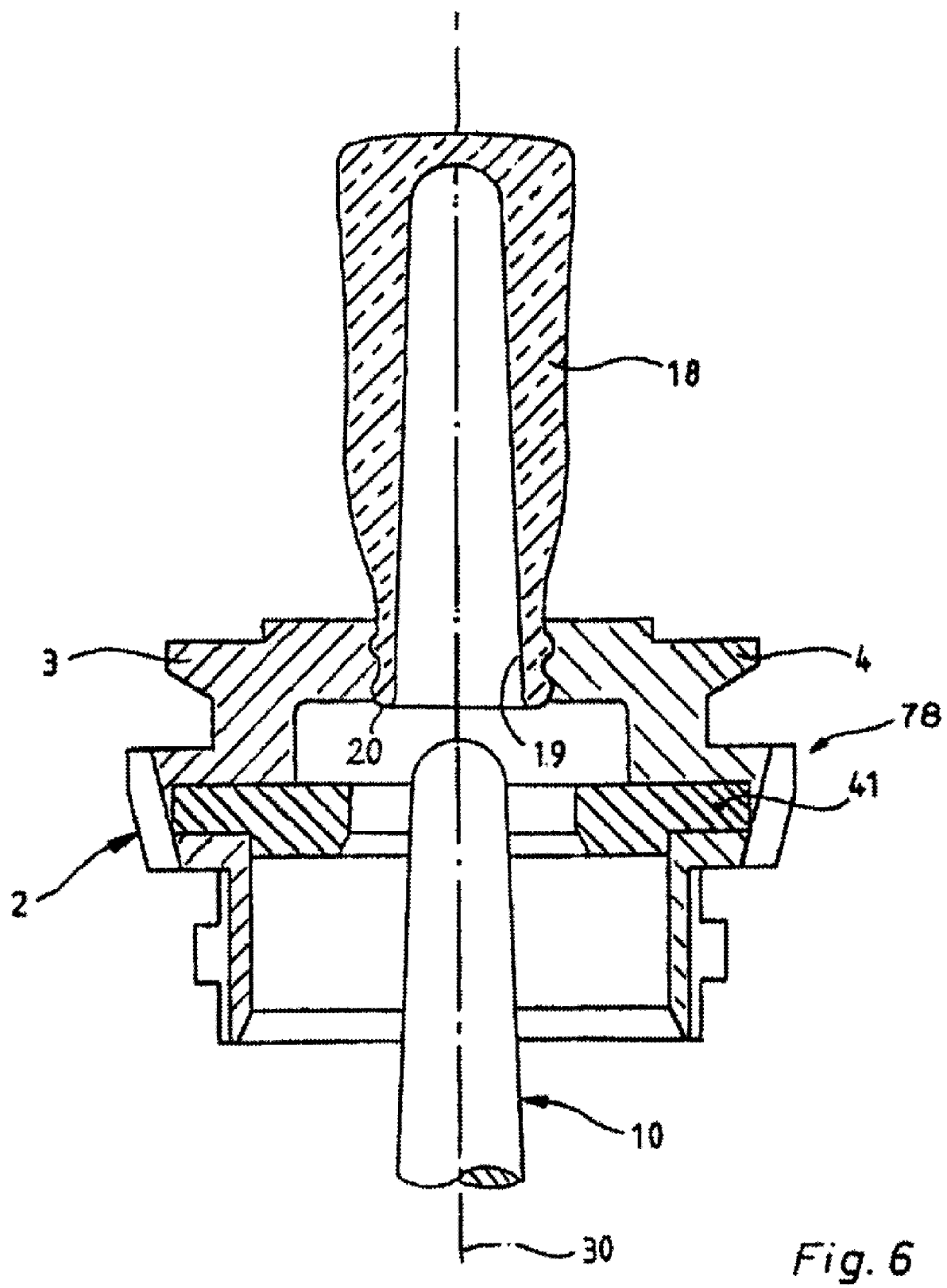
Figure 7:
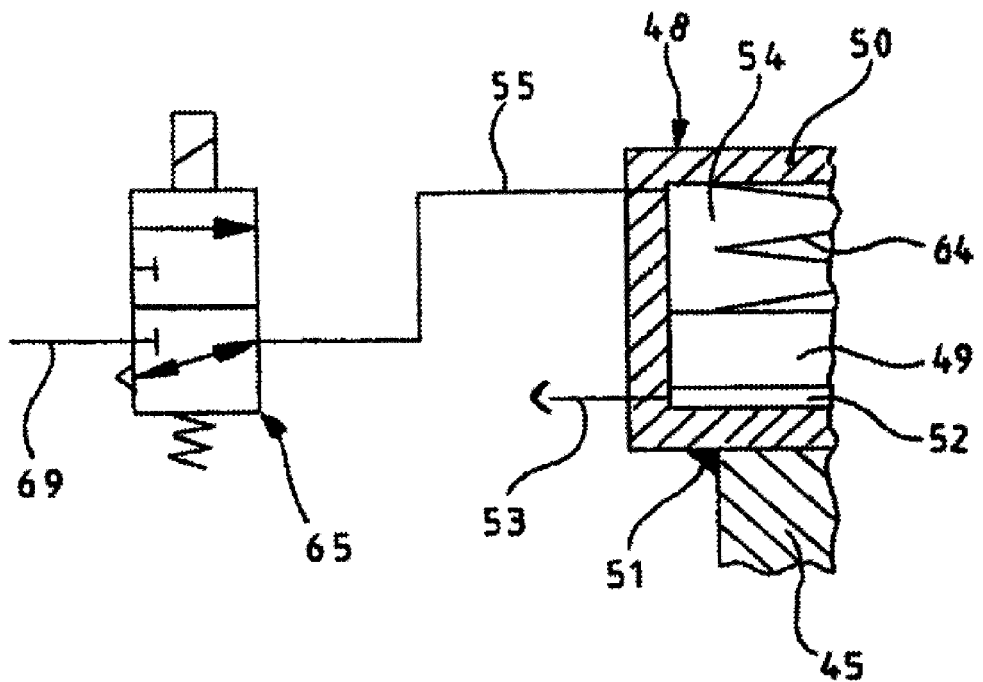
Figure 8:
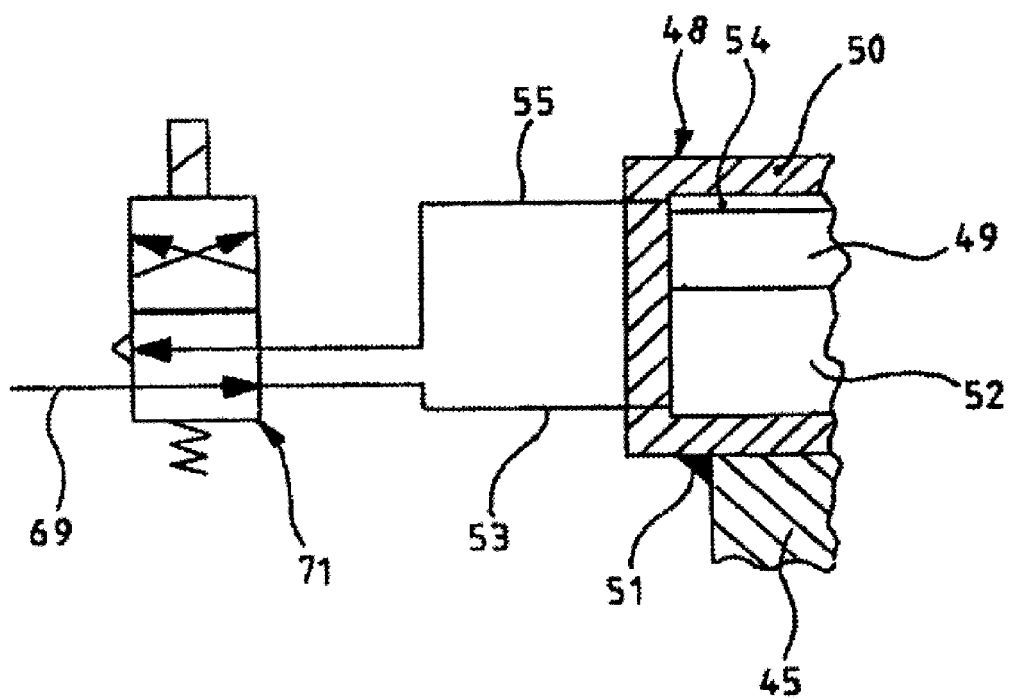
Figure 9:
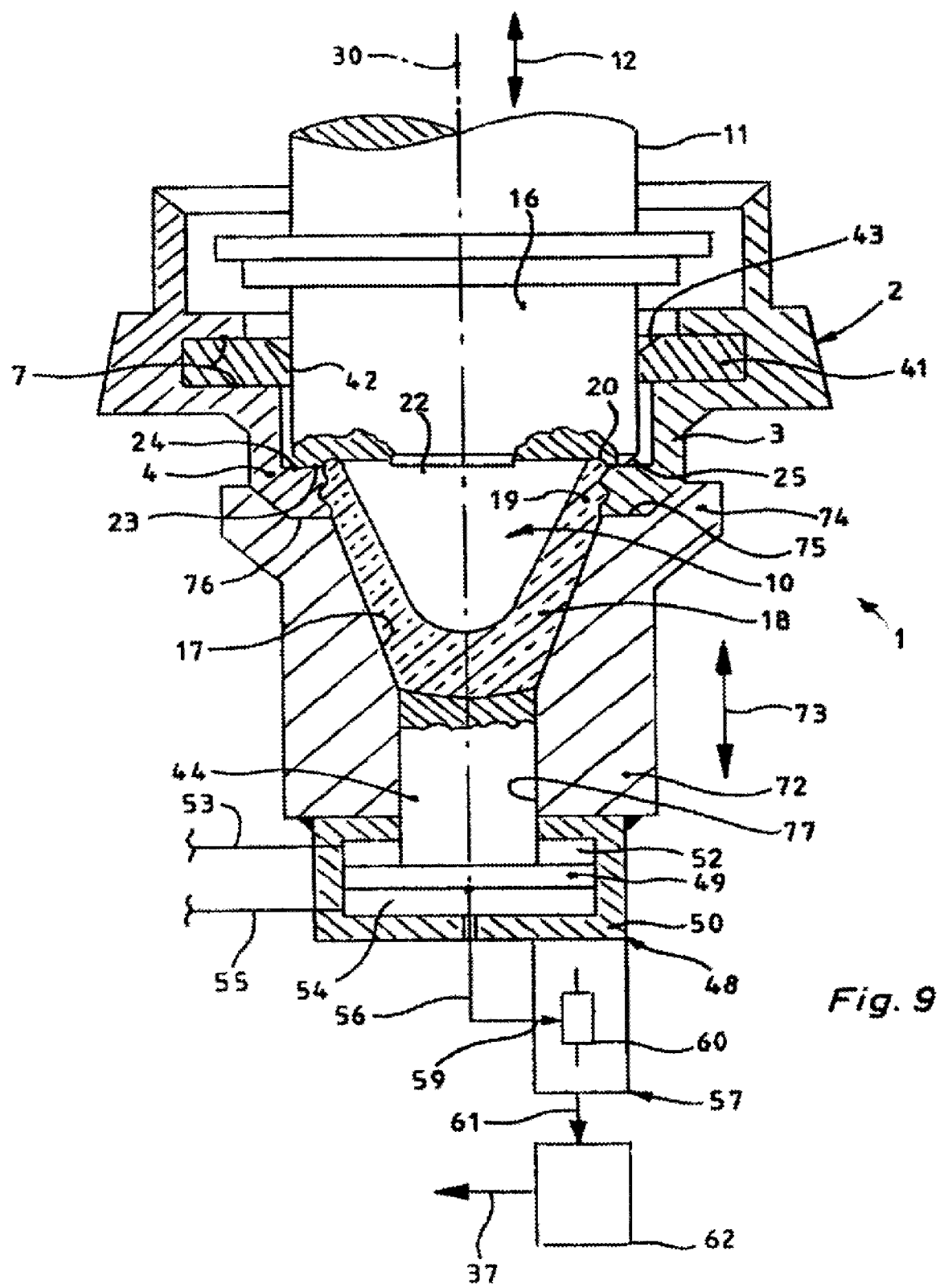

The shaft 16 which is formed wider than the pressing plunger 10 lies adjacent to the foot 22 of the pressing plunger 10. The forming ring 21 for forming the axially outer edge 20 of the neck 19 is formed in an annular end face 23 of the shaft 16 adjacent to the foot 22. Moreover, the annular end face 23 as shown in FIGS. 4, 5 and 9 lies against a stop surface 24 of the closed neck tool 2 for the purpose of defining the end operating position of the pressing plunger 10. The annular end face 23 chamfers radially outwards to become a chamfer 25 at the cylindrical shaft 16.

Figure 3:
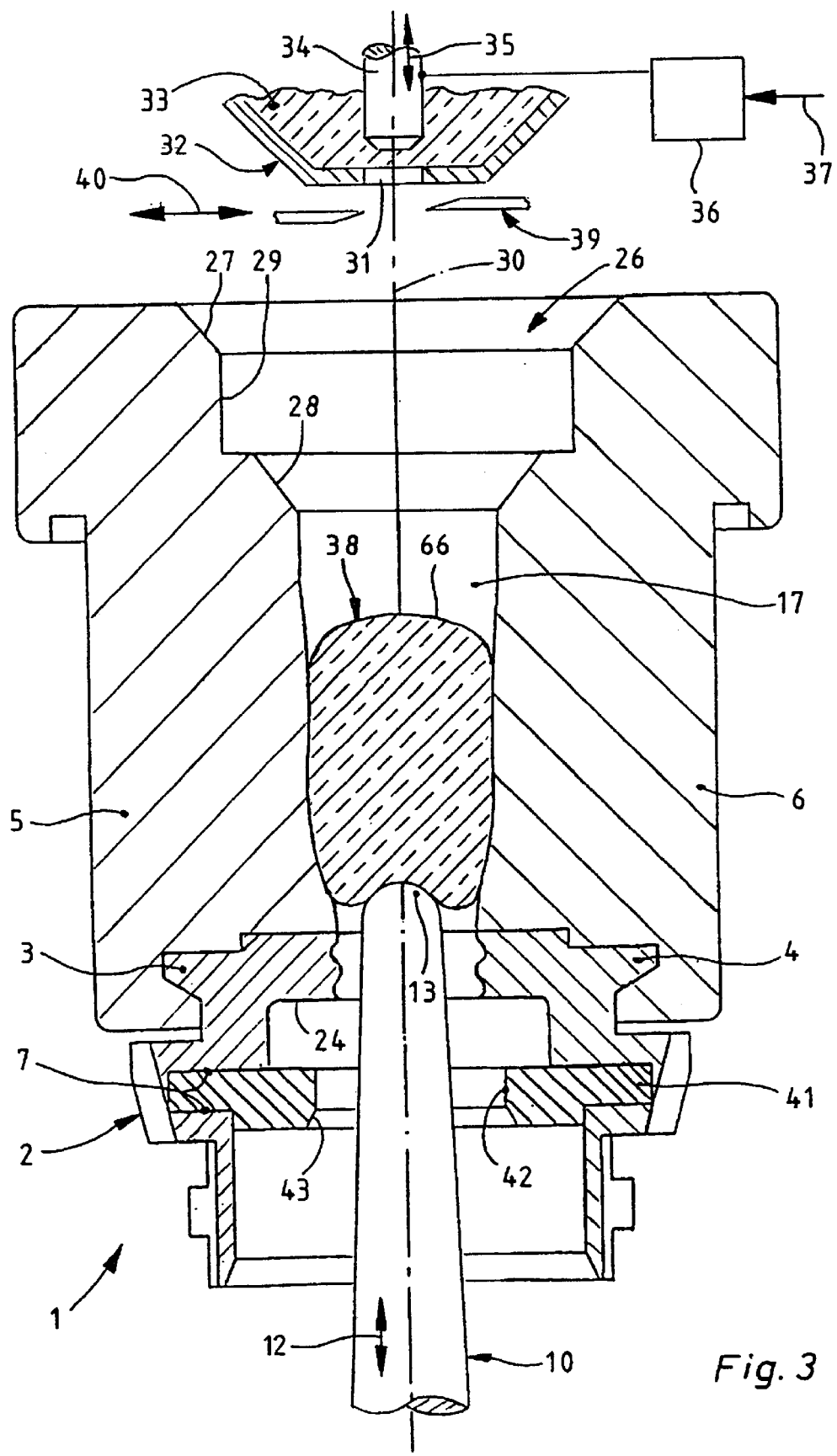
FIG. 3 shows a longitudinal sectional view through a closed parison mold according to the invention with an open loading orifice and the pressing plunger in the loading position.

As shown in FIG. 3, the parison mold 1 has a neck mold 78 which has a longitudinally divided neck tool 2 having closed neck tool halves 3, 4, and likewise shows closed parison mold halves 5,6. The neck mold here also includes a non-longitudinally divided centering ring 41. The pressing plunger 10 is located in an axial intermediate position, the so-called loading position in which the plunger tip 13 has penetrated the neck tool 2 and a short piece penetrates the cavity 17 of the parison mold halves 5, 6. A loading orifice 26 is formed in the upper region of the parison mold halves 5, 6. The loading orifice 26 is formed substantially in a funnel shape with conical wall sections 27 and 28. A cylindrical receiving section 29 is located between the conical wall sections 27,28.

An orifice 31 of a feed device 32, which contains molten glass 33, is disposed above the loading orifice 26 coaxially with a longitudinal axis 30 of the parison mold 1. A feeder plunger 34, which can be raised or lowered in the directions of the double arrow 35 in a manner known per se by means of a drive 36, is disposed in the glass 33 coaxially with the orifice 31. The drive 36 is controlled by way of a line 37 so that the molten glass 33 exits the orifice 31 in such a manner that ultimately glass gobs 38 have the most constant mass possible. A strand 33 of molten glass exits in a manner known per se the orifice 31 in dependence upon the vertical movement of the feeder plunger 34. The glass gobs 38 are severed from this glass strand 33 in succession by means of a shear mechanism 39 which can move in the directions of the double arrow 40. The glass gobs 38 fall either directly into the loading orifice 26 or are introduced into the loading orifice 26 by means of a trough system known per se, which for sake of simplicity is not illustrated.

Referring to FIG. 3, such a glass gob 38 has been introduced into the cavity 17 through the loading orifice 26 and has fallen onto the plunger tip 13. The plunger tip 13 had slightly penetrated the glass gob 38 but not so far that the glass mass would pass into the region of the neck tool halves 3, 4.

FIG. 3 shows the radially outer part of the centering ring 41, which is not longitudinally divided, held in the holding groove 7 of the neck tool 2. The centering ring 41 comprises a cylindrical middle through-passage 42 which at the bottom becomes an extension 43 of the centering ring 41.

FIG. 4 shows a later stage in the method than in FIG. 3. First, a pressing element 44 comprising a guide sleeve 45 is inserted from above into the loading orifice 26 as shown in FIG. 1. The guide sleeve 45 comprises at the bottom and radially outwards a chamfer 46 which facilitates the introduction of the loading sleeve 45 into the conical wall section 27 and the cylindrical receiving section 29. The guide sleeve 45 is finally disposed in the manner illustrated in FIG. 4 with a slide fit in the receiving section 29 and is located with its lower axial stop against an annular stop surface 47 of the parison mold halves 5,6. The stop position is maintained by means of a mechanism, not illustrated, which moves the assembly 44, 45, 48, until the finished parison is subsequenty removed from the mold. The pressing element 44 is formed as a piston rod of a piston-cylinder unit 48 which is pneumatic in this instance. A piston 49, attached to the pressing element 44, of the unit 48 can be displaced in a cylinder 50 of the unit 48. The cylinder 50 is attached to the guide sleeve 45, for example by a weld seam 51. A first cylinder chamber 52 is connected to a line 53 and a second cylinder chamber 54 is connected to a line 55.

A sensing element 56 of a displacement sensor 57 is connected to the piston 49. The displacement sensor 57 is attached to the cylinder 50. The sensing element 56 is guided in a displaceable manner through a sealed opening 58 in the cylinder 50. The sensing element 56 is moreover connected to a brush 59 of a potentiometer 60 of displacement sensor 57. An output line 61 of the displacement sensor 57 is connected to an electrical control device 62 whose output is connected to line 37 (cf. FIG. 3).

Figure 7:
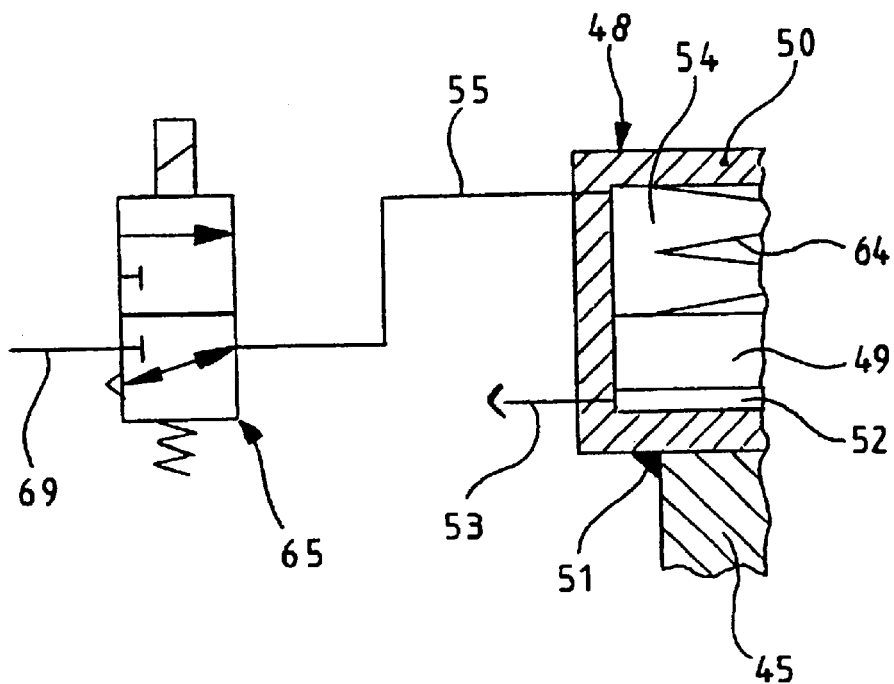
FIGS. 7 and 8 show connection diagrams for different operating types of pressing elements.

A pressure spring 64 is disposed between the piston 49 and an outer wall 63 of the cylinder 50 and said pressure spring prestresses the piston 49 and the pressing element 44 in the downwards direction in FIG. 4. For this purpose a 3 port/2 position valve 65 is connected to the line 55 as shown in FIG. 7. The line 53 issues to the atmosphere.

If the assembly consisting of the pressing element 44, guide sleeve 45 and piston-cylinder unit 48 is now inserted into the loading orifice 26 as shown in FIG. 3 from above, the pressing element 44 is received into the cavity 17 as deep as possible owing to the pushing effect of the pressure spring 65 and to the effect of its own weight. The pressing plunger 10 is then moved upwards out of its loading position illustrated in FIG. 3. In so doing, the chamfer 25 of the cylindrical shaft 16 makes its way into the extension 43 of the centering ring 41 and thus centers the pressing plunger 10 relative to the neck mold 78. From here the shaft 16 is guided in a strictly radial manner in the middle through-passage 42 of the centering ring 41. The pressing plunger 10 is centered accordingly exactly relative to the parison mold 1. The upwards movement of the pressing plunger 10 continues until the annular end face 23 of the shaft 16 moves into position against the stop surface 24 of the neck tool 2. Until this position is achieved, pressing plunger 10 moves further into the glass gob 38 and pushes a base 66 of the glass gob 38 in contact with a surface 67 of the pressing element 44, which surface faces the glass gob 38. At this time, as shown in FIG. 7, the second cylinder chamber 54 is vented via the line 55. Against the force of the pressure spring 64 and the intrinsic weight of the pressing element 44 and of the piston 49, the glass gob 38 is therefore able to displace said pressing element and said piston upwards without encountering any resistance until as shown in FIG. 4 the annular end face 23 lies against the stop surface 24. From this moment onwards the pressing plunger 10 is only a passive forming element. The pressing plunger 10 has at this time taken up its continuously uniform, defined position relative to the neck tool 2 and the parison mold halves 5, 6. The neck 19 (FIG. 1) of the parison 18 is formed accordingly in a constant manner.

In the method stage illustrated in FIG. 4, the neck chamber in the neck tool 2 and in the forming ring 21 is not yet filled with molten glass. This first occurs in the next method step, the end of which is illustrated in FIG. 5.

Furthermore, referring to FIG. 5, the pressing plunger 10 is located in its uppermost end operating position in which the annular end face 23 lies against the stop surface 24. By switching the directional control valve 65 shown in FIG. 7 into its lower switching position the line 55 and thus the second cylinder chamber 54 were connected to a pneumatic pressure line 69. This caused the piston 49 and the pressing element 44 to be displaced out of the position illustrated in FIG. 4 into the lowest position illustrated in FIG. 5. In so doing, the parison 18 was also finish-pressed in the region of its neck 19. The brush 59 has likewise moved to its lowest possible position relative to the potentiometer 60. This pressing plunger position information passes via the output line 61 into the electrical control device 62 which where appropriate makes an adjustment to the mass of the glass gob 38 via the stroke of the plunger 34.

Figure 6:
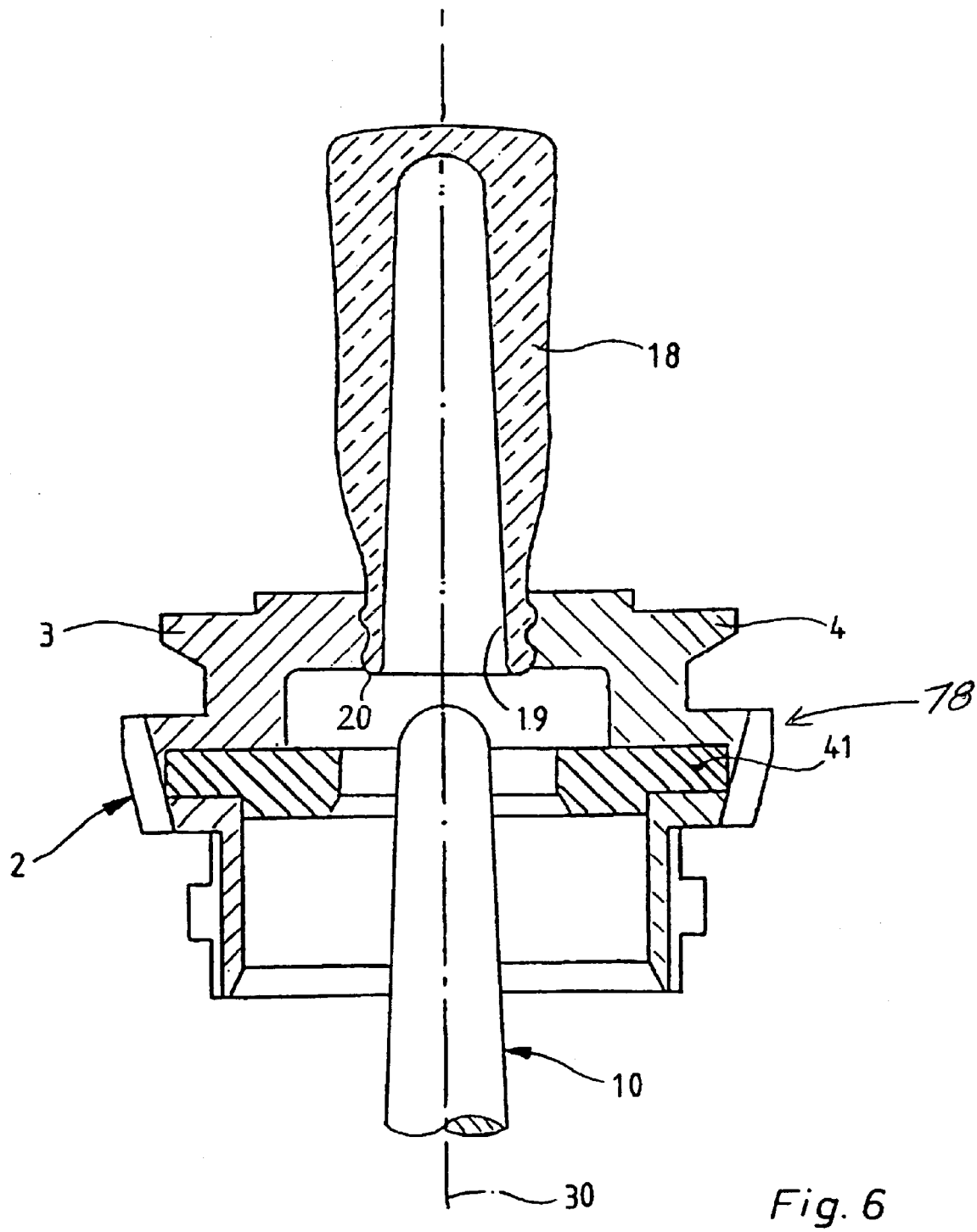
FIG. 6 shows a longitudinal sectional view through the closed neck tool with a finished parison and the pressing plunger in its lowermost or end discharge position.

As the parison 18 has now been finish-pressed, it can be removed from the mold. For this purpose, the directional control valve 65 is first switched into in its upper switched position illustrated in FIG. 7 and the second cylinder chamber 54 is vented. The pressing plunger 10 is then drawn back out of its end operating position illustrated in FIG. 5 into its lowest end discharge position illustrated in FIG. 6. Subsequently, the assembly consisting of the pressing element 44, guide sleeve 45 and piston-cylinder unit 48 is removed. Finally, the parison mold halves 5, 6 are opened in a manner known per se.

The pressing plunger 10 is now located fully outside the parison 18 and is lowered to the extent that the neck tool 2 with the centering ring 41 and with the parison 18 can be transferred into a finish-forming station, known per se and not further illustrated, of the press-blow glass forming machine. This generally happens in the case of the I.S. glass forming machines by means of a so-called invert mechanism which pivots the neck tool 2 and the parison 18 by 180° about a horizontal axis into the finish-forming station, where the parison 18 is then disposed with the neck 19 towards the top.

Figure 8:
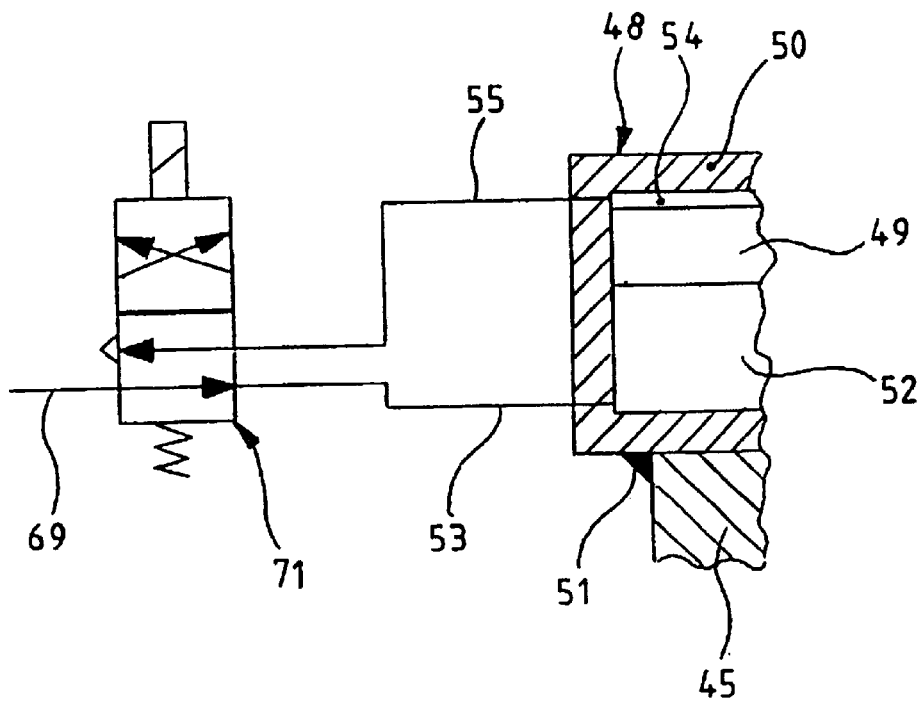

The lines 53, 55 of the cylinder 50 can also be controlled in other ways. For this purpose, the lines 53, 55 are connected in the manner illustrated in FIG. 8 to a 4 port/2 position valve 71. In the upper switched position, illustrated in FIG. 8, of the directional control valve 71 the first cylinder chamber 52 is influenced by compressed air, as a result of which the piston 49 is displaced with the pressing element 44 into its uppermost end position. A pressure spring corresponding to the pressure spring 64 in FIGS. 4 and 5 is not necessary in this case. On the contrary, the cylinder 50 is designed and connected double-acting. The pressing element 44 and the piston 49 then also remain in this uppermost position when the assembly 44, 45, 48 is placed on the parison mold 1 which is now loaded with the glass gob 38. This uppermost position of the pressing element 44 and the piston 49 can be maintained until the pressing plunger 10 has arrived at its uppermost end operating position as shown in FIG. 4 and 5. Until this point, the surface 67 of the pressing element 44 is normally not in contact with the base 66 of the glass gob 38. Only when the pressing plunger has arrived at its uppermost end operating position as shown in FIG. 4 is the directional control valve 71 switched downwards in FIG. 8. As a consequence, the first cylinder chamber 52 is vented and the second cylinder chamber 54 is influenced by compressed air. As a result, the piston 49 moves downwards with the pressing element 44 and finish-presses the parison 18 in the same manner, as this was described in connection with FIG. 5. The molding process then continues as far as the state illustrated in FIG. 6 in the same manner as previously described.

FIG. 9 corresponds to FIG. 5 in so far as in FIG. 9 the parison 18 is likewise finish-pressed in the parison mold 1 which is still closed. In this case, a so-called wide-neck glass with a comparatively large diameter neck will subsequently be produced from a parison 18 in the finish-forming station. In place of the longitudinally-divided parison mold halves 5, 6 in preceding figures, a block mold 72 which is not longitudinally-divided is used in FIG. 9. The block mold 72 can be raised and lowered in the directions of the double arrow 73 by means of a lifting mechanism known per se and not further illustrated. For the purpose of closing the parison mold 1 as shown in FIG. 9, the neck tool 2 is first closed. The block mold 72 is then raised until a radial annular surface 75 of the block mold lies against a corresponding annular surface 76 of the neck tool 2. A conical locking ring 74 has moved simultaneously into position against a corresponding conical counter surface of the neck tool 2. The locking ring 74 prevents the closed neck tool 2 from unintentionally opening during the pressing process. The pressing element 44 can be displaced in a base orifice 77 of the block mold 72 similar to FIGS. 7 and 8. The cylinder 50 in this case is, for example, attached by a weld seam or screws to the base of the block mold 72.

Also as shown in FIG. 9, the pressing process is performed in two stages, namely with a preliminary pressing process as shown in FIG. 4 and a finish-pressing process as shown in FIG. 5.

As an alterative to FIG. 9, the block mold 72 can also be disposed with the cavity 17 downwards. The glass gob is then introduced through the base orifice 77. The base orifice 77 can be designed for this purpose corresponding to the funnel-shaped loading orifice 26 in FIG. 3. For loading purposes, the piston-cylinder unit 48, the pressing element 44 and the displacement sensor 57 must be removed from the block mold 72 in a similar manner, as in FIG. 3 from the closed parison mold halves 5, 6.

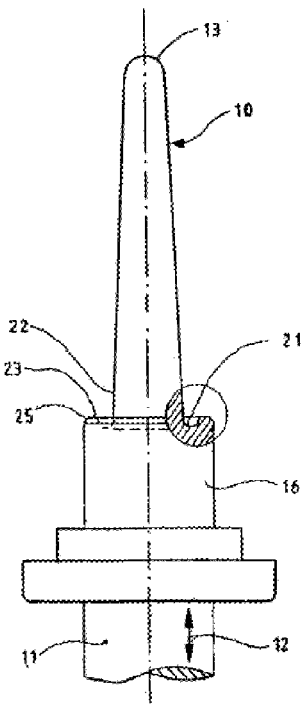

What is claimed is:

1. A method for producing a parison in a parison mold, wherein the parison has a neck, a base and an axially outer sealing edge of the neck, wherein the parison mold has a cavity and seperate a neck mold, the neck mold having a through passage and a longitudinally-divided neck tool which forms the neck of the parison, and wherein the neck tool has a stop surface, said method comprising the steps of:

(a) introducing a gob of molten glass into said cavity of said parison mold;

(b) pressing a pressing plunger into said gob through the through passage until said pressing plunger reaches an end operating position defined by the stop surface; and wherein said pressing plunger lies against said neck mold, whereby the parison is preliminarily pressed;

(c) simultaneously with or following step (b), exerting pressure on the base of the parison with a pressing element, which defines part of the cavity, by moving said pressing element towards said press plunger until the cavity is completely filled with said molten glass and the parison is finished-pressed, wherein the axially outer sealing edge of the neck is completely formed by the pressing plunger.

2. A method according to claim 1, further comprising the steps of:

following step (c), removing the parison mold from the parison, with the exception of the neck tool, and removing said pressing plunger from the parison; and transferring the parison, held by the neck tool at the neck, to a finish-forming station.

3. A method according to claim 1, further comprising the steps of:

contacting said gob with the pressing element within the cavity opposite to said pressing plunger upon the step of pressing said pressing plunger through said through passage and into said gob of molten glass; and moving said pressing element in a direction out of said cavity, said moving being done by said gob acting on said pressing element.

4. A method according to claim 1, wherein said parison mold comprises longitudinally-divided parison mold halves having a loading orifice formed in a base of said parison mold halves, said method further comprising the steps of:

introducing said gob of molten glass into said cavity through said loading orifice; and closing said loading orifice with said pressing element.

5. A method according to claim 3, wherein said parison mold comprises longitudinally-divided parison mold halves having a loading orifice formed in a base of said parison mold halves, said method further comprising the steps of:

introducing said gob of molten glass into said cavity through said loading orifice; and closing said loading orifice with said pressing element.

6. A method according to claim 1, further comprising the steps of:

determining a maximum penetration depth of said pressing element into said cavity by sensing the movement of said pressing element relative to said parison mold; and controlling the mass of said gob of molten glass introduced into said cavity by sensing the movement of said pressing element relative to said parison mold.

7. A method according to claim 3, further comprising the steps of:

determining a maximum penetration depth of said pressing element into said cavity by sensing the movement of said pressing element relative to said parison mold; and controlling the mass of said gob of molten glass introduced into said cavity by sensing the movement of said pressing element relative to said parison mold.

8. A method according to claim 4, wherein step (c) is performed by moving said pressing element through said loading orifice into said cavity, and said method further comprising the steps of:

determining the maximum penetration depth of said pressing element into said cavity by sensing the movement of said pressing element relative to said parison mold; and controlling the mass of said gob of molten glass introduced into said cavity by sensing the movement of said pressing element relative to said parison mold.

9. An apparatus for producing a parison from a gob of molten glass, wherein said parison has a neck, a base, and an axially outer sealing edge, said apparatus comprising:

a parison mold having a cavity, a loading orifice through which said molten gob is received into said cavity, and a seperate neck mold having a longitudinally divided neck tool for forming the neck of the parison, said neck mold having a through passage;

a pressing plunger movable through said through passage for pressing into said glass gob in said cavity, said pressing plunger being movable to an end operating position wherein the pressing plunger lies against the neck tool, thereby preliminarily pressing said parison, said pressing plunger being configured to completely form said axially outer sealing edge, a pressing element movable relative to said parison mold and which defines a part of said cavity, said pressing element capable of exerting pressure on the base of said parison in said cavity until said cavity is completely filled with said molten glass and said parison is finished-pressed, including the formation of the axially outer sealing edge; and said pressing plunger being removable from said parison after the parison has been finished-pressed.

10. An apparatus according to claim 9, wherein said parison mold comprises longitudinally-divided parison mold halves, said loading orifice is formed in a base of said parison mold halves, and said pressing element is movable into said cavity through said loading orifice and is capable of closing said loading orifice.

11. An apparatus according to claim 9, wherein said parison mold comprises a non longitudinally-divided block mold comprising said loading orifice and which has a locking ring that lies adjacent to the neck tool, wherein said pressing element is displaceably mounted in a lower base orifice of said block mold, and said neck tool in the upwards direction is adjacent to said loading orifice of said block mold.

12. An apparatus according to claim 9 further comprising:

a shaft adjacent to a foot of the pressing plunger, said shaft having an annular end face and is wider than said pressing plunger, and a forming ring for forming said complete axially outer sealing edge of the neck, said forming ring being formed in said annular end face.

13. An apparatus according to claim 10 further comprising:

a shaft adjacent to a foot of the pressing plunger, said shaft having an annular end face and is wider than said pressing plunger, and a forming ring for forming said complete axially outer sealing edge of the neck, said forming ring being formed in said annular end face.

14. An apparatus according to claim 11 further comprising:

a shaft adjacent to a foot of the pressing plunger, said shaft having an annular end face and is wider than said pressing plunger, and a forming ring for forming said complete axially outer sealing edge of the neck, said forming ring being formed in said annular end face.

15. An apparatus according to claim 12, wherein said neck tool includes a stop surface engageable with said end face of said shaft to define said end operating position of said pressing plunger.

16. An apparatus according to claim 13, wherein said neck tool includes a stop surface engageable with said end face of said shaft to define said end operating position of said pressing plunger.

17. An apparatus according to claim 14, wherein said neck tool includes a stop surface engageable with said end face of said shaft to define said end operating position of said pressing plunger.

18. An apparatus according to claim 9 further comprising a cylindrical shaft adjacent to a foot of the pressing plunger, and a centering ring fixed relative to said parison mold, said cylindrical shaft being received on a last part of the path of the pressing plunger as far as its end operating position in said centering ring so as to be guided and centered in the radial direction through said centering ring.

19. An apparatus according to claim 11 further comprising a cylindrical shaft adjacent to a foot of the pressing plunger, and a centering ring fixed relative to said parison mold, said cylindrical shaft being received on a last part of the path of the pressing plunger as far as its end operating position in said centering ring so as to be guided and centered in the radial direction through said centering ring.

20. An apparatus according to claim 12 further comprising a cylindrical shaft adjacent to a foot of the pressing plunger, and a centering ring fixed relative to said parison mold, said cylindrical shaft being received on a last part of the path of the pressing plunger as far as its end operating position in said centering ring so as to be guided and centered in the radial direction through said centering ring.

21. An apparatus according to claim 15 further comprising a cylindrical shaft adjacent to a foot of the pressing plunger, and a centering ring fixed relative to said parison mold, said cylindrical shaft being received on a last part of the path of the pressing plunger as far as its end operating position in said centering ring so as to be guided and centered in the radial direction through said centering ring.

22. An apparatus according to claim 18 wherein said centering ring is undivided longitudinally and is held radially outwards in a holding groove of the neck tool.

23. An apparatus according to claim 21 wherein said centering ring is undivided longitudinally and is held radially outwards in a holding groove of the neck tool.

* * * * *

UNITED STATES PATENT AND TRADEMARK OFFICE
CERTIFICATE OF CORRECTION

PATENT NO.         : 6,698,241 B1                                    Page 1 of 10
APPLICATION NO. : 09/786668
DATED              : March 2, 2004
INVENTOR(S)        : Schwarzer It is certified that error appears in the above-identified patent and that said Letters Patent is hereby corrected as shown below:

Formal drawings are attached to replace the informal drawings printed in the patent Column 10, line 36, change "press" to --pressing--

Delete the title page, showing an illustrative figure and substitute the attached title page.

Delete drawing sheet 1-8 and substitute the attached sheets containing figures 1-9.

Signed and Sealed this

Eighth Day of January, 2008

JON W. DUDAS
*Director of the United States Patent and Trademark Office*

(54) METHOD AND DEVICE FOR PRESSING A GOB

(75) Inventor: Siegfried Schwurzer, Stöckse (DE)

(73) Assignee: Hermann Heye, Obernkirchen (DE)

(*) Notice: Subject to any disclaimer, the term of this patent is extended or adjusted under 35 U.S.C. 154(b) by 286 days.

(21) Appl. No.: 09/786,668

(22) PCT Filed: Jul. 25, 2000

(86) PCT No.: PCT/EP00/07088

§ 371 (c)(1),
(2), (4) Date: Mar. 8, 2001

(87) PCT Pub. No.: WO01/09049

PCT Pub. Date: Feb. 8, 2001

(30) Foreign Application Priority Data

Jul. 30, 1999 (DE) .................................. 199 35 866

(51) Int. Cl.⁷ .......................... C03B 11/06; C03B 11/16
(52) U.S. Cl. .......................... 65/29.12; 65/76; 65/79; 65/158; 65/160; 65/229; 65/362
(58) Field of Search .......................... 65/29.12, 29.18, 65/76, 79, 158, 160, 229, 323, 362

(56) References Cited

U.S. PATENT DOCUMENTS

| 424,524 | A | * | 4/1890 | Washington | 65/177 |
|---|---|---|---|---|---|
| 781,539 | A | * | 1/1905 | Marsh | 65/209 |
| 1,670,821 | A | * | 5/1928 | Pauwing et al. | 65/229 |
| 4,336,050 | A |  | 6/1982 | Northup | 65/82 |
| 4,411,681 | A |  | 10/1983 | Northup | 65/77 |
| 4,662,923 | A | * | 5/1987 | Vajda et al. | 65/29.15 |
| 4,662,928 | A |  | 5/1987 | Dauer | 65/307 |
| 5,236,485 | A | * | 8/1993 | Leweringhaus et al. | 65/29.1 |
| 5,318,616 | A | * | 6/1994 | Keller | 65/158 |

FOREIGN PATENT DOCUMENTS

| DE | 32 32 288 C1 | 10/1983 | C03B/9/193 |
|---|---|---|---|
| EP | 0 327 240 A1 | 8/1989 | C03B/9/40 |
| GB | 2 178 421 A | 2/1987 | C03B/5/26 |

* cited by examiner

*Primary Examiner*—Sean Vincent
(74) *Attorney, Agent, or Firm*—Synnestvedt & Lechner LLP

(57) ABSTRACT

Method and apparatus for pressing a parison. A parison mold is composed of neck tool halves and parison mold halves. A gob of molten glass had first been introduced through an upper loading orifice into a cavity of the parison mold, while a pressing plunger was located in a lower loading position. An assembly consisting of a pressing element, a guide sleeve and a piston-cylinder unit was introduced into the loading orifice. Subsequently the pressing plunger was raised from its loading position into the illustrated upper end operating position until its annular end face had moved into position against a stop surface of the neck tool. Following the preliminary pressing process a neck chamber in the cavity is still free from molten glass. It is only at this point that the pressing element exerts pressure on a base of the parison which is being produced. The molten glass is also pressed into the hitherto still free neck chamber of the cavity. The finish-pressing process of the parison is thus completed and the parison mold can be opened for the purpose of transferring the parison into a finish-forming station.

23 Claims, 8 Drawing Sheets

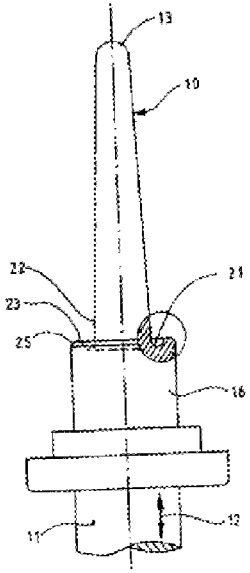

UNITED STATES PATENT AND TRADEMARK OFFICE
CERTIFICATE OF CORRECTION

PATENT NO.         : 6,698,241 B1
APPLICATION NO.    : 09/786668
DATED              : March 2, 2004
INVENTOR(S)        : Schwarzer It is certified that error appears in the above-identified patent and that said Letters Patent is hereby corrected as shown below:

Formal drawings are attached to replace the informal drawings printed in the patent Column 10, line 36, change "press" to --pressing--

Delete the title page, showing an illustrative figure and substitute the attached title page.

Delete drawing sheet 1-8 and substitute the attached sheeets containing figures 1-9.

This certificate supersedes the Certificate of Correction issued January 8, 2008.

Signed and Sealed this

Twenty-ninth Day of January, 2008

JON W. DUDAS
*Director of the United States Patent and Trademark Office*

(12) United States Patent
Schwarzer

(10) Patent No.: US 6,698,241 B1
(45) Date of Patent: Mar. 2, 2004

(54) METHOD AND DEVICE FOR PRESSING A GOB

(75) Inventor: Siegfried Schwarzer, Stöckse (DE)

(73) Assignee: Hermann Heye, Obernkirchen (DE)

(*) Notice: Subject to any disclaimer, the term of this patent is extended or adjusted under 35 U.S.C. 154(b) by 286 days.

(21) Appl. No.: 09/786,668
(22) PCT Filed: Jul. 25, 2000
(86) PCT No.: PCT/EP00/07088
§ 371 (c)(1), (2), (4) Date: Mar. 8, 2001
(87) PCT Pub. No.: WO01/09049
PCT Pub. Date: Feb. 8, 2001

(30) Foreign Application Priority Data

Jul. 30, 1999 (DE) .......................... 199 35 866

(51) Int. Cl.[7] .................. C03B 11/06; C03B 11/16
(52) U.S. Cl. .................. 65/29.12; 65/76; 65/79; 65/158; 65/160; 65/229; 65/362
(58) Field of Search .................. 65/29.12, 29.18, 65/76, 79, 158, 160, 229, 323, 362

(56) References Cited

U.S. PATENT DOCUMENTS

| | | | | |
|---|---|---|---|---|
| 424,524 A | * | 4/1890 | Washington | 65/177 |
| 781,539 A | * | 1/1905 | Marsh | 65/209 |
| 1,670,821 A | * | 5/1928 | Pauwing et al. | 65/229 |
| 4,336,050 A | | 6/1982 | Northup | 65/82 |
| 4,411,681 A | | 10/1983 | Northup | 65/77 |
| 4,662,923 A | * | 5/1987 | Vajda et al. | 65/29.15 |
| 4,662,928 A | | 5/1987 | Dauer | 65/307 |
| 5,236,485 A | * | 8/1993 | Leweringhaus et al. | 65/29.1 |
| 5,318,616 A | * | 6/1994 | Keller | 65/158 |

FOREIGN PATENT DOCUMENTS

| | | | | |
|---|---|---|---|---|
| DE | 32 32 288 C1 | 10/1983 | | C03B/9/193 |
| EP | 0 327 240 A1 | 8/1989 | | C03B/9/40 |
| GB | 2 178 421 A | 2/1987 | | C03B/5/26 |

* cited by examiner

Primary Examiner—Sean Vincent
(74) Attorney, Agent, or Firm—Synnestvedt & Lechner LLP

(57) ABSTRACT

Method and apparatus for pressing a parison. A parison mold is composed of neck tool halves and parison mold halves. A gob of molten glass had first been introduced through an upper loading orifice into a cavity of the parison mold, while a pressing plunger was located in a lower loading position. An assembly consisting of a pressing element, a guide sleeve and a piston-cylinder unit was introduced into the loading orifice. Subsequently the pressing plunger was raised from its loading position into the illustrated upper end operating position until its annular end face had moved into position against a stop surface of the neck tool. Following the preliminary pressing process a neck chamber in the cavity is still free from molten glass. It is only at this point that the pressing element exerts pressure on a base of the parison which is being produced. The molten glass is also pressed into the hitherto still free neck chamber of the cavity. The finish-pressing process of the parison is thus completed and the parison mold can be opened for the purpose of transferring the parison into a finish-forming station.

23 Claims, 8 Drawing Sheets